(12) United States Patent
Crawley

(10) Patent No.: US 10,915,113 B2
(45) Date of Patent: *Feb. 9, 2021

(54) VERSATILE AUTONOMOUS MOBILE PLATFORM WITH 3-D IMAGING SYSTEM

(71) Applicant: Ubiquity Robotics, Inc., San Jose, CA (US)

(72) Inventor: David Alexander Crawley, San Jose, CA (US)

(73) Assignee: Ubiquity Robotics, Inc., San Jose, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/191,388

(22) Filed: Nov. 14, 2018

(65) Prior Publication Data

US 2019/0079532 A1    Mar. 14, 2019

Related U.S. Application Data

(63) Continuation-in-part of application No. 15/391,824, filed on Dec. 27, 2016, now abandoned, which is a
(Continued)

(51) Int. Cl.
*G05D 1/02* (2020.01)
*G01S 17/931* (2020.01)
(Continued)

(52) U.S. Cl.
CPC ............ *G05D 1/0248* (2013.01); *B25J 5/007* (2013.01); *B25J 9/0087* (2013.01); *B25J 11/008* (2013.01); *G01S 7/4808* (2013.01); *G01S 17/36* (2013.01); *G01S 17/87* (2013.01); *G01S 17/89* (2013.01); *G01S 17/931* (2020.01); *G05D 2201/0211* (2013.01)

(58) Field of Classification Search
USPC .......................................................... 701/23
See application file for complete search history.

(56) References Cited

U.S. PATENT DOCUMENTS 8,594,844 B1 * 11/2013 Gal .......................... F41H 7/005
                                                                 700/245
9,557,740 B2 *  1/2017 Crawley .............. G05D 1/0248
(Continued)

*Primary Examiner* — Tyler D Paige
(74) *Attorney, Agent, or Firm* — Franklin M. Schellenberg

(57) ABSTRACT

An autonomous mobile system comprising: a means of achieving mobility, a means of navigating, a means of providing autonomous power, and a means of providing general purpose computing. In some embodiments, the system comprises a base unit capable of sensing its environment and computing navigation instructions to direct the system to move to particular locations and execute functions as directed by a set of programmed instructions. In some embodiments, two or more time-of-flight (TOF) imaging systems are attached to measure distance to objects in the environment, which may in turn be used by the means of navigating. In some embodiments, a coupling exists on the base unit to attach additional structures and mechanisms. These structures may comprise a means for carrying packages or other items, robotic manipulators that can grab and move objects, interactive audio and video displays for telepresence applications, a means for serving food and drink, etc.

19 Claims, 29 Drawing Sheets

Related U.S. Application Data continuation of application No. 13/999,863, filed on Mar. 28, 2014, now Pat. No. 9,557,740.

(60) Provisional application No. 61/957,412, filed on Jul. 2, 2013, provisional application No. 62/619,863, filed on Jan. 21, 2018.

(51) Int. Cl.
| | |
|---|---|
| *G01S 17/87* | (2020.01) |
| *B25J 5/00* | (2006.01) |
| *B25J 9/00* | (2006.01) |
| *B25J 11/00* | (2006.01) |
| *G01S 7/48* | (2006.01) |
| *G01S 17/89* | (2020.01) |
| *G01S 17/36* | (2006.01) |

(56) References Cited

U.S. PATENT DOCUMENTS

| | | | | |
|---|---|---|---|---|
| 2007/0219666 | A1* | 9/2007 | Filippov | G05D 1/0061 |
| | | | | 700/245 |
| 2012/0165977 | A1* | 6/2012 | Sanchez | B25J 9/08 |
| | | | | 700/245 |
| 2012/0328395 | A1* | 12/2012 | Jacobsen | B25J 3/04 |
| | | | | 414/1 |
| 2014/0031977 | A1* | 1/2014 | Goldenberg | B62D 55/075 |
| | | | | 700/245 |
| 2015/0012163 | A1* | 1/2015 | Crawley | G05D 1/0248 |
| | | | | 701/23 |
| 2016/0271803 | A1* | 9/2016 | Stewart | B62D 57/024 |
| 2017/0300060 | A1* | 10/2017 | Crawley | G05D 1/0248 |
| 2018/0255705 | A1* | 9/2018 | Keski-Luopa | A01D 69/06 |
| 2019/0079532 | A1* | 3/2019 | Crawley | G01S 7/4808 |

* cited by examiner

VERSATILE AUTONOMOUS MOBILE PLATFORM WITH 3-D IMAGING SYSTEM

CROSS-REFERENCE TO RELATED APPLICATIONS

This Patent Application is a Continuation-in-Part of U.S. patent application Ser. No. 15/391,824, entitled VERSATILE AUTONOMOUS MOBILE PLATFORM and filed Dec. 27, 2016, which in turn is a Continuation of U.S. patent application Ser. No. 13/999,863, entitled AUTONOMOUS MOBILE PLATFORM FOR SERVICE APPLICATIONS, filed Mar. 28, 2014 and issued as U.S. Pat. No. 9,557,740 on Jan. 31, 2017, and which in turn claims the benefit of U.S. Provisional Patent Application 61/957,425, entitled Extensible Robot System, filed Jul. 2, 2013; and all of these Issued Patents and Patent Applications are incorporated herein by reference in their entirety. The present Application also claims the benefit of U.S. Provisional Patent Application 62/619,863, entitled 3-D Imaging System, filed Jan. 21, 2018, which is also incorporated herein by reference in its entirety.

FIELD OF THE INVENTION

This disclosure relates to an autonomous mobile platform that can be flexibly extended to serve in a number of service applications, such as beverage vending, package delivery, or telepresence, through the addition of physical accessories or software. It furthermore relates to an autonomous mobile platform comprising a 3-D environmental imaging system.

BACKGROUND OF THE INVENTION

Robotic systems are often constrained to a narrow set of operations that are the aim of their design, and generally cannot be applied to a wide variety of applications. It is therefore desirable to have a machine unit that can be mass produced, reducing costs, and yet tasked with a variety of roles, from serving food and drink, to conveying items in a manufacturing area, to supporting other functionality such as marketing or telepresence. For the navigation systems of such autonomous systems, radar, LIDAR or ultrasonic units are often used to sense the surrounding areas, yet are often fairly complex and expensive, raising the cost of such a system. There is therefor a need for a robotic platform having mobility, navigation, power and computing capabilities, along with a means for attaching various additional items to extend the capabilities, and having an efficient and inexpensive 3-D environment sensing system to aid in the unit's navigation and other tasks using information about the environment.

BRIEF SUMMARY OF THE INVENTION

The invention disclosed with this Application is a autonomous mobile system comprising: a means of achieving mobility, a means of navigating, a means of providing autonomous power, and a means of providing general purpose computing.

In some embodiments, the system comprises a base unit capable of sensing its environment and computing navigation instructions to direct the system to move to particular locations and execute particular functions, as directed by a set of programmed instructions.

In some embodiments, a coupling exists on the base unit to attach additional structures and mechanisms that extend its capabilities. These structures may comprise a means for carrying packages or other items, robotic manipulators that can grab and move objects, interactive audio and video displays that support telepresence applications, a means for serving food and drink, and the like. These extensions may be designed to be detachable and interchangeable, or may be designed to be permanently attached to the base unit.

In some embodiments, the base unit comprises a 3-D imaging system having two or more time-of-flight sensors, each comprising a modulated light source and a detector synchronized for phased detection of the modulated light that has originated from the modulated light sources and is reflected or scattered off remote objects. The phased detection allows time-of-flight determination of the distance to the remote object, and the multiple time-of-flight sensors allow a field of view larger than 180°. Data from the time-of-flight sensors is integrated into a comprehensive representation of the surrounding environment using a local microcontroller. This data can, in turn, be provided to the navigation system of the robotic platform to aid in robotic navigation.

DETAILED DESCRIPTIONS OF EMBODIMENTS OF THE INVENTION

I. Introduction

This Application discloses embodiments of an invention for an extensible robotic system comprising: a means to move through the environment, a power source, a computing device, and a navigation system. Furthermore, the embodiments of the invention comprise an attachment means that allow the disclosed system to be a platform upon which additional robotic capabilities can be placed. These capabilities may include, but are not limited to, mechanical manipulation, the dispensing of products or service items, the receipts of objects, the display of audio/video signals for use as telepresence robot, and the like.

In some embodiments, the means to move through the environment shall comprise two wheels in a differential drive arrangement. In some embodiments, these wheels may also comprise brushless DC hub motors.

In some embodiments, the power source may be provided by an electric battery.

In some embodiments, the computing capability may be provided by a single or multi-core microprocessor that executes a sequence of software instructions stored in non-volatile memory.

In some embodiments, the navigation system will comprise sensors and computing capabilities that detect aspects of the environment around it. In some embodiments, the navigation system comprises a room sensor that has the ability to create distance measurements from the robot to walls and other objects in the room, In some embodiments, the distance measurements may comprise a light detection and ranging (LIDAR, or lidar) system. In some embodiments, the distance measurements may use time-of-flight sensors as the room sensor.

Although the above descriptions present an embodiment of the invention, one aspect of the embodiments described here is that they may also serve as a platform for additional functionality. This functionality can take several forms, depending on the field of use, and may be implemented by attaching additional devices and mechanisms to the basic platform. In particular, additional functionality can be added to provide the capability to manipulate physical objects. Or, additional functionality can be added to provide the capability to serve drinks. Or, additional functionality can be added to provide the capability for telepresence, providing video and audio capabilities to both transmit and receive signals through wireless systems and the Internet. Additional functionalities will be disclosed in the present Application, and may be known to those skilled in the art.

II. A First Embodiment

Shown in FIGS. 1-5 are aspects of a first embodiment of the invention.

Figure 1:
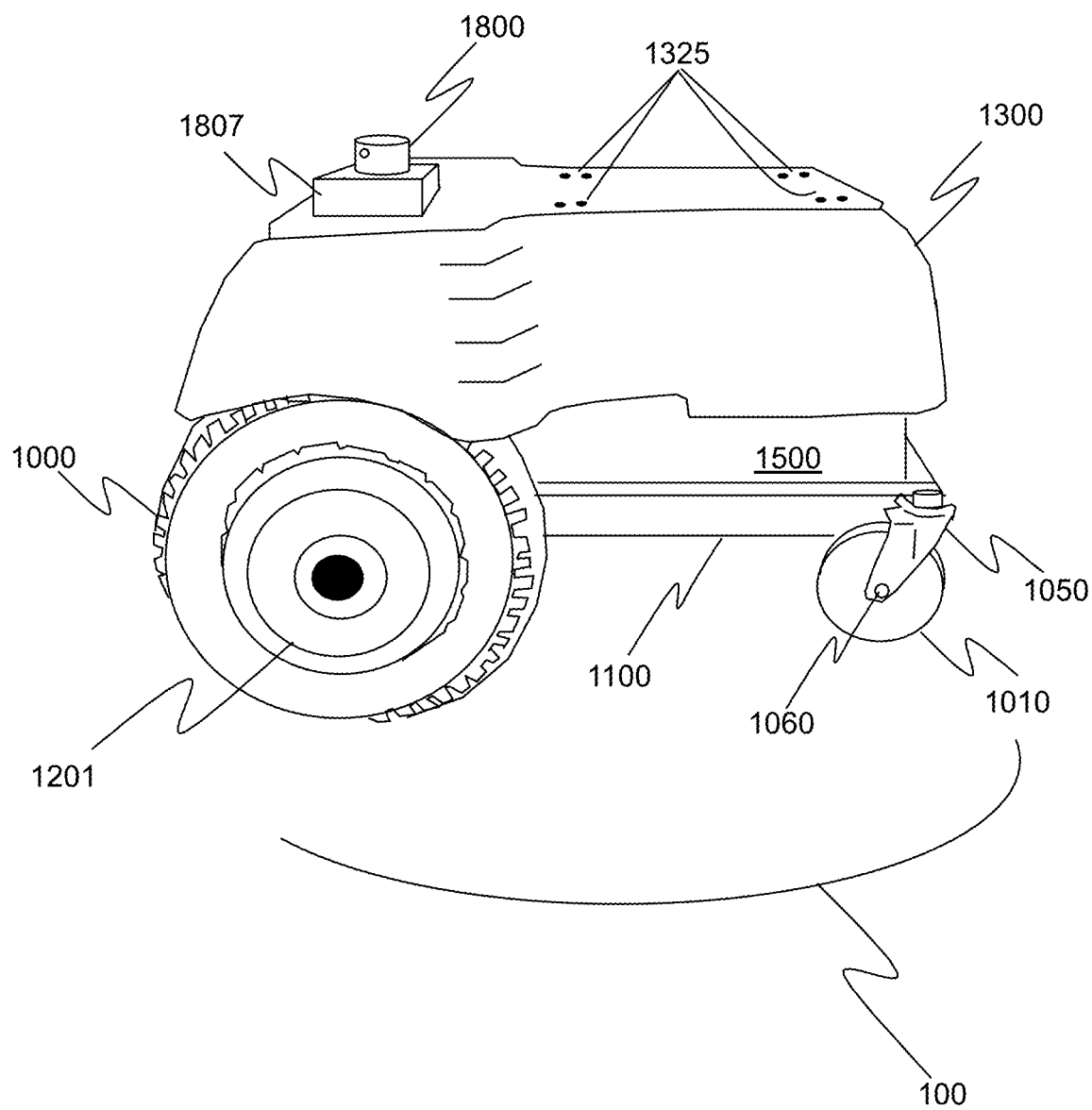
FIG. 1 illustrates a side view of a first embodiment of the invention.
Figure 2:
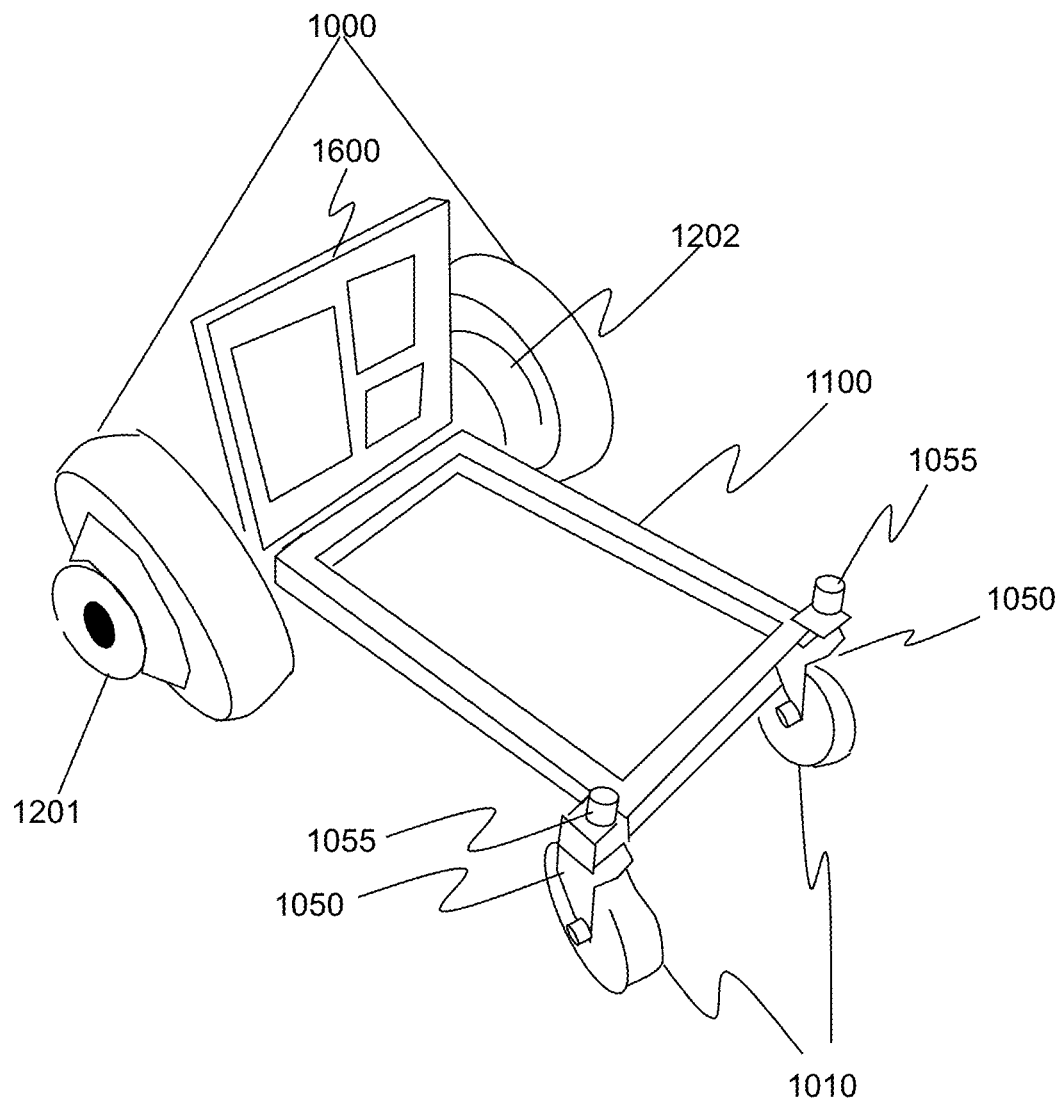
FIG. 2 illustrates a view from above of the embodiment of FIG. 1, with the cover and battery removed.

As illustrated in FIGS. 1 and 2, this embodiment comprises a base unit 100 that comprises a chassis 1100 supported by two front wheels 1000 and two rear wheels 1010. As presented here, the rear wheels have an attachment mechanism 1055 (such as a bolt) that secures a caster-like mechanism that allows the rear wheels to pivot, allowing a change in direction. This mechanism may comprise a fork 1050 supporting an axle 1060 with bearings that passes through the wheels 1010. The rear wheels 1010 can be manufactured from any number of materials known to those skilled in the art, such as a low durometer plastic or a plastic rim with a synthetic rubber or polyurethane tire as the outer surface.

The front wheels 1000 in this embodiment are larger than the rear wheels 1010, and each front wheel 1000 has its own individual fixed axle with screw threads machined into the axle, and is attached to the chassis 1100 using a bolt. The outer surface of the wheels 1000 in this embodiment has a rubber surface with an embossed tread to allow better traction. The front wheels 1000 in this embodiment serve as drive wheels, and comprise brushless DC hub motors 1201 and 1202 within the wheels which can drive the left and right wheels independently, using power from a battery 1500. These brushless DC motors 1201 and 1202 have the stator attached to the axle, while the rotator is affixed to a gear that drives the outer part of the wheel in a planetary gear arrangement.

This embodiment also comprises a cover 1300 supported by a hinge attached to the chassis 1500 at the front, between the front wheels 1000. In this embodiment, on top of, and attached to, the cover 1300, the system has a LIDAR system comprising a LIDAR head 1800 (which typically comprises a laser source and at least one detector) and associated control electronics 1807. In this embodiment, the LIDAR system may be a commercially available system such as the Hokuyo UTM-30LX, manufactured by the Hokuyo Automatic Company Ltd. of Osaka, Japan. The cover 1300 may also comprise means for attaching other accessories, such as holes 1325 that allow a correspondingly designed accessory to be bolted to the cover to provide additional functionality.

Figure 3:
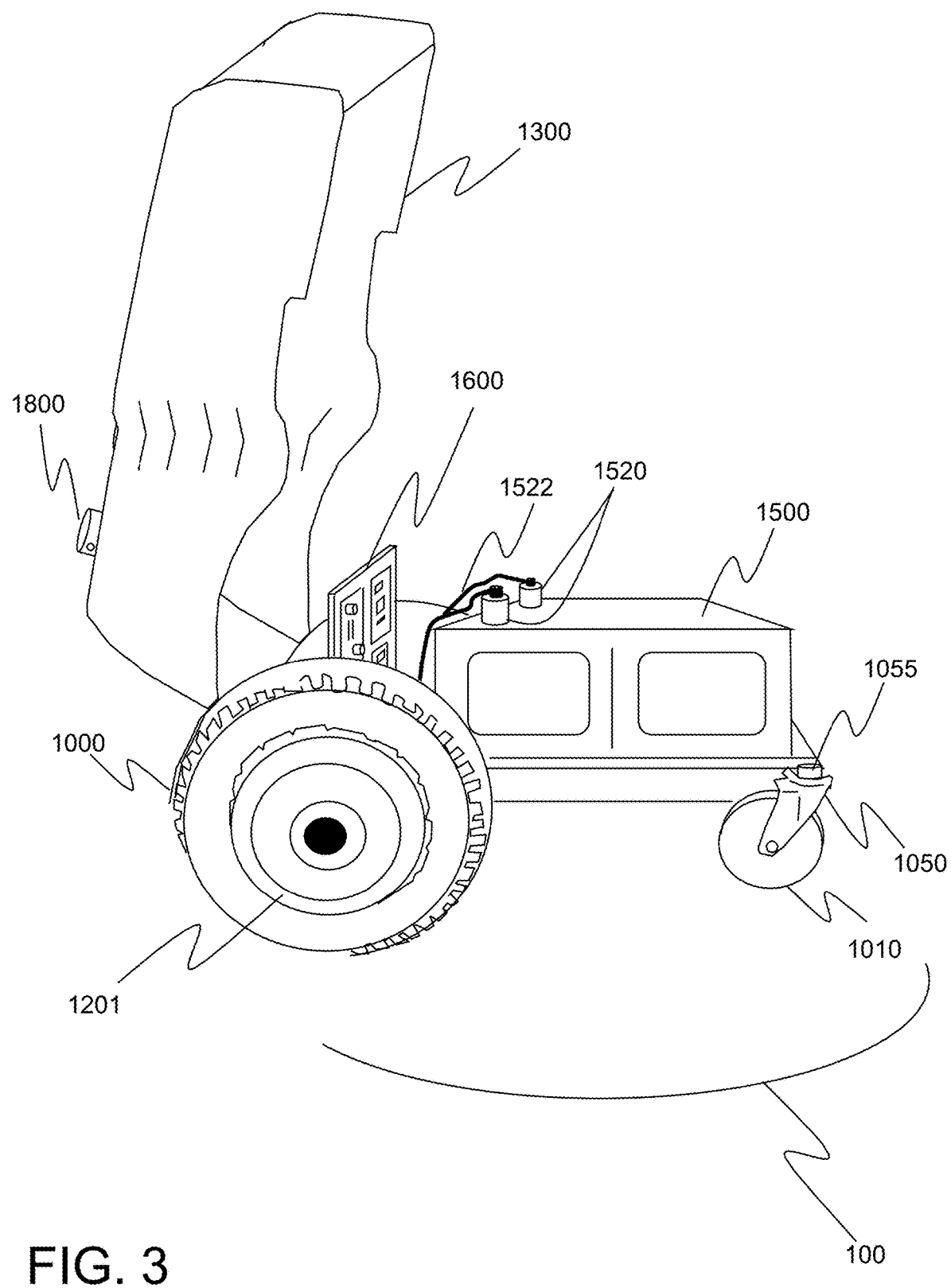
FIG. 3 illustrates a side view of the first embodiment of the invention, with the cover raised and the battery installed.

As shown in FIGS. 2 and 3, with the cover either removed or tilted, the system additionally comprises a support board 1600 with attached printed circuit boards comprising electronic circuits that control the system. As illustrated here, the support board 1600 is mounted vertically, between the front wheels 1000 and in front of the battery 1500. A cable 1522 from the battery attaches the terminals 1520 of the battery to the electronics boards to provide power, and the boards in turn provide power to the hub motors 1201 and 1202.

Figure 4:
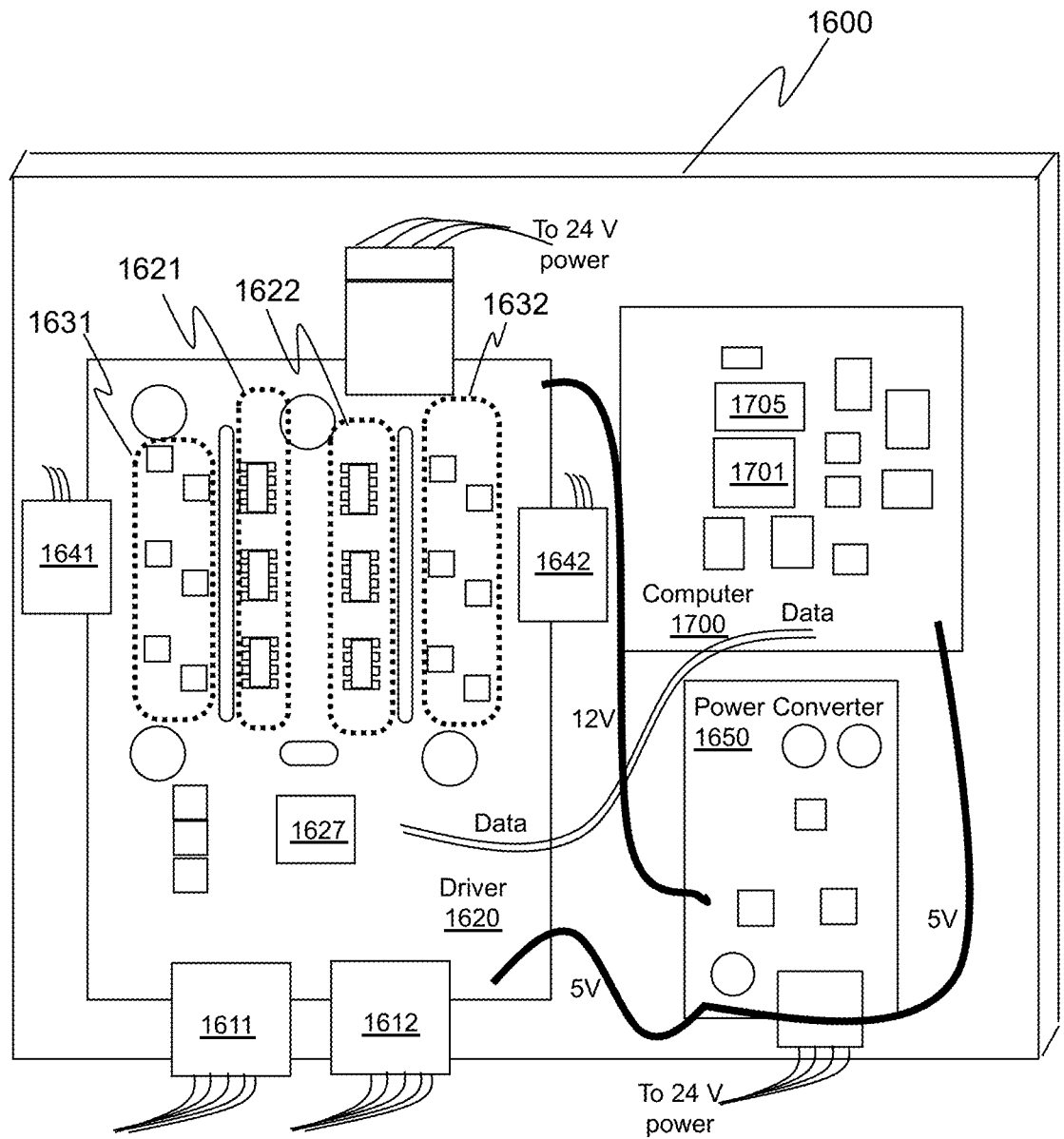
FIG. 4 illustrates a view of a set of printed circuit boards for the first embodiment of the invention.
Figure 5:
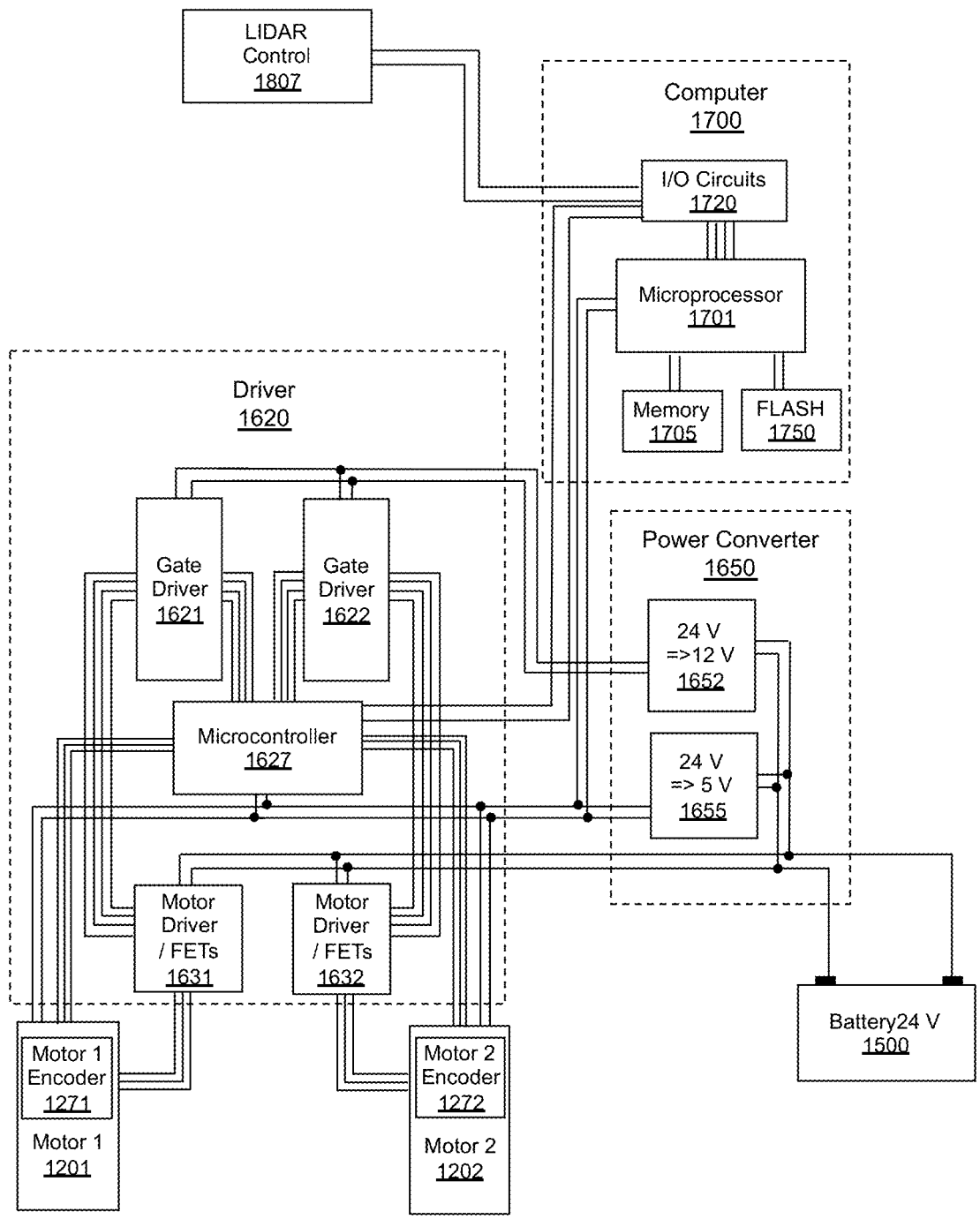
FIG. 5 illustrates a circuit schematic block diagram for the printed circuit boards illustrated in FIG. 4.

FIGS. 4 and 5 illustrate one embodiment of the control circuit boards in more detail. FIG. 4 represents a sketched view of the physical circuit boards as they would be mounted to the support 1600; FIG. 5 illustrates a schematic block diagram of the electronic function.

In the illustrated embodiment, the various electronic tasks have been partitioned between three circuit boards, one serving as a power converter 1650, one serving as a general purpose computer 1700, and one serving as driver 1620. It will be clear, however, that those skilled in the art could design a single circuit board that comprises all these functions, or that these tasks could be partitioned between two, four, five or more circuit boards. Also, although these can be constructed from printed circuit boards (PCBs), other electronic technologies may be used to implements circuits that accomplish the same electronic results.

The power source is a 24-volt deep cycle sealed lead acid battery 1500, which is mounted to the rear portion of the chassis 1100. 24 volts has been chosen for this embodiment because that is the voltage needed to drive the front motors 1201 and 1202 in the front wheels 1000 and further provides excellent acceleration and motor efficiency for motors of this size, while not being so high as to require complex power handling circuitry, a large number of batteries or difficult-to-secure battery charging systems.

Because most electronic circuits require lower voltages, one of the circuit boards 1650 comprises one or more power converters that take as input the 24 volt battery voltage and output 5 volts (for powering digital electronics). In the embodiment presented, this board also comprises additional converters that take as input the 24 volt battery voltage and output 12 volts to provide power for either onboard or accessory systems such as WiFi radios or small motors such as servos that may be required for attached accessories.

The 5 volt output from the 5 volt converter 1655 on the power converter board 1650 in turn provides power for the computer 1700, which comprises at least one microprocessor 1701 and the associated memory 1705, Flash storage 1750, associated local power regulation and conditioning, one or more ports to allow the insertion of preprogrammed media, a networking port, wireless/WiFi communication circuitry and input/output (I/O) circuits 1720. The I/O circuits 1720 may in turn be connected to the LIDAR controller 1807, which relays raw signals from the LIDAR head 1800 for processing by the navigation system software, stored in the computer flash storage 1750.

In this embodiment, the microprocessor 1701 may be a Rockchip R3188 quad-core ARM A9 microprocessor, such as provided in the commercially available model such as the Radxa Rock, available from the Radxa Corporation of Shenzen, China, which may serve as the main computer 1700. In such a computer board, software is loaded on to a removable flash device and inserted in the flash socket. This board also comprises on-board Wi-Fi provided. External network connectivity may also be provided.

The 5 volt output from the 5-volt converter 1655 on the power converter board 1650 also provides power for the digital circuits in the driver board 1620, such as the microcontroller 1627 and the motor encoders 1271 and 1272 that provide position information about the wheels.

The microcontroller 1627 directs the motion of the brushless DC motors. In this embodiment, the brushless DC motors comprise Hall sensor encoders, which produce signals related to the position of the coils on the wheels and transmit them to the microcontroller through encoder connectors 1611 and 1612. As will be understood by those skilled in the art, the microcontroller may take the input from the Hall sensors and, using a set of instructions loaded onto the microcontroller for this purpose, determine which coils on the motor should be switched on to achieve a rotation of the wheel. The microcontroller switches these coils on by activating pulse width modulated (PWM) I/Os on the microcontroller, which in turn connect to gate drivers 1621 and 1622, which in turn switch on the motor driver FETs 1631 and 1632, which in turn provide power through connectors 1641 and 1642 to the motor coils themselves.

The 12 volt output from the 12 volt converter 1652 on the power converter board 1650 provides 12V DC power to the Gate drivers 1621 and 1622, which are used by the gate driver to run a boot-strap power circuit that enables the gate driver to generate signals powerful enough to switch the FETs 1631 and 1632 on completely and quickly. The signals from the gate drivers enter the FET combinations 1631 and 1632. These FETs are arranged in three half-H bridge arrangements, and govern the application of the 24-volt source to actually provide power to the hub motors 1201 and 1202. As will be understood by those skilled in the art, the brushless-DC motors 1201 and 1202 typically comprise three sets of coils, and in a typical configuration, two are activated at any one time in order to cause the motor to move. In a usual configuration, one coil is activated to push and another is activated to pull the rotator, and the Hall sensor determines which two are activated at any one time and the microcontroller as described above. As the motor turns, the Hall sensor detects this motion and switches the appropriate set of coils on and off.

In this embodiment, this microcontroller may also accept coded instructions through a data connection from the microprocessor 1701 sent via the I/O circuitry. These coded instructions may comprise many different instructions, including descriptions the motion to be achieved by the wheels, or instructions to the microcontroller to perform other system maintenance/system monitoring tasks.

An example of an instruction describing motion would be the transmission of a target speed to be achieved over a predetermined time. The microcontroller will be programmed in such a manner as to continuously monitor and calculate the speed of the wheels using the signals arriving from the encoders associated with each wheel, and can thus determine the difference between the targeted speed and the desired speed. The microcontroller can then convert this difference in to an instruction to the microcontroller's onboard pulse width modulator (PWM) system to increase or decrease the duty cycle of the PWM signal. This PWM signal is fed through the gate drivers 1621 and 1622 to the motor driver FETs 1631 and 1632 and results in a corresponding increase or decrease in the current directed into the coils of the motor, causing the motors to go faster or slower.

Through a similar sequence of operations, the direction of motion may also be controlled, in that an instruction from the microprocessor to turn left or turn right can be converted by the microcontroller to signals to drive the left wheel 1201 and right wheel 1202 at different rates, turning the system as it moves.

The microcontroller 1627 also performs other functions useful as part of the system. In particular the microcontroller may, upon receipt of an instruction from the microprocessor 1701, report the position of the wheels, the angular distance moved by the wheels or the speed by calculating this information from information derived from the motor encoders back to the microprocessor 1701.

The microcontroller 1627 may also automatically stop the wheels from moving if it detects an abnormality, in particular if it detects an abnormality in the voltage received at the driver board. This functionality may be provided on the microcontroller by the use of onboard programmable analog circuitry that may be provided with the microcontroller.

The microcontroller 1627 may also provide test functionality to test the driver circuit, either for manufacturing or system management purposes. The microcontroller program would direct the microcontroller to use its onboard analog to digital converter (ADC) to measure voltages at all pins connected to other parts of the circuit at start up and during operation. It will compare the readings from its onboard ADC to preprogrammed normal ranges and when the voltages are outside the normal range it would generate an error code that, at the request of the microprocessor 1701 would be reported back to the microprocessor. Alternatively the microcontroller may take other actions to alert a user that there is an error such as direct the wheels to move back and forth with a frequency in the audible range thus creating a characteristic humming sound that would be noticed by a user or elevate the voltage on one of the microcontroller's output pins for measurement by a user.

III. Alternative Variations

The previous description has disclosed one embodiment of the invention. However, each of the elements of the invention may have variations that may be used, singularly or in various combinations.

III.a. Alternative Options for the Drive Mechanism

The above embodiment discloses a base unit 100 comprising two drive wheels 1000 and two additional support wheels 1010. Additional embodiments in which only one additional support wheel (with three wheels in total) may be employed. Likewise, embodiments configured with additional wheels, such as a configuration with three wheels on each side (which may be more flexible for crossing uneven terrain) may be employed.

In such a six wheel configuration, two wheels may be the drive wheels, as described above, while the other wheels provide passive support; or additional encoders and motors may be provided for the additional wheels, and additional programming may be used to use two, four, or six wheels or any subset thereof to drive and navigate the system.

Likewise, in any of the configurations, each of the wheels may be provided with a motor and encoder to be independently driven. Such an "all-wheel drive" system may offer certain advantages for use in certain environments or for travel over certain types of surfaces or terrain.

In the first embodiment described above, brushless DC hub motors 1201 and 1202 were employed. However, other embodiments employing DC motors comprising brushes may also be designed by those skilled in the art.

In the first embodiment as described above, individual wheels are driven by motors independently, and accomplishing motion of the system with a particular direction or speed is coordinated by the microcontroller and microprocessor. In other embodiments, a single motor may be provided to provide motive force, with those drive wheels driven, for example, using a differential to transmit power to a subset of the wheels. In such a system, steering may be accomplished using a second system, such as an Ackermann steering geometry, or any other steering configuration known to those skilled in the art.

Figure 6:
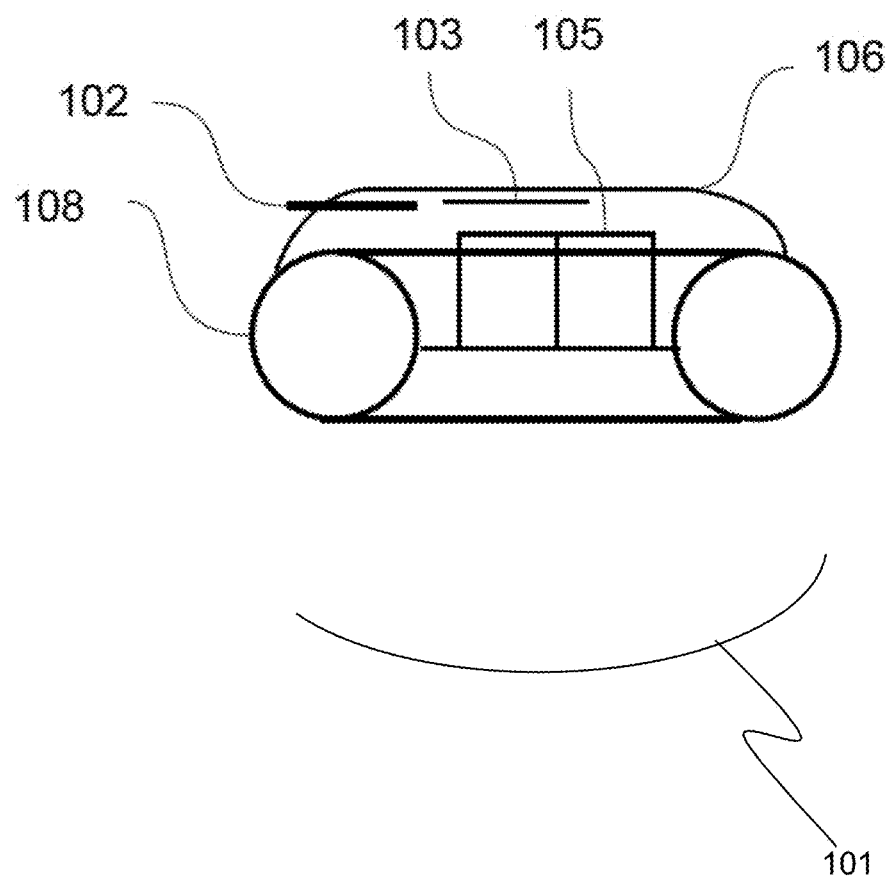
FIG. 6 illustrates an embodiment of the invention in which the drive system comprises a continuous track system.

Alternatively, in some embodiments, instead of the wheels driving the system directly, the drive system may comprise a continuous track system with a continuous band of treads 108 driven by two or more wheels, as is illustrated in FIG. 6. In this illustration, the base unit 101 comprises a room sensor 102 with a computer system 103. The computer system may comprise of an onboard computer or computers, or it may comprise of a system to connect to an off-board or "cloud" based computing system or service, or it may be configured as some combination of these two options. The entire arrangement is powered by a power-source 105 such as a battery and held together by a set of structural members 106 that may completely or partially enclose many of the systems. In this arrangement there may be one or more casters 107 that create stability of the system without the need for active balancing. Such systems as used, for example, on a larger scale in military tanks or on farm equipment, can distribute the weight over a larger area, and provide better traction on rough ground.

Figure 7:
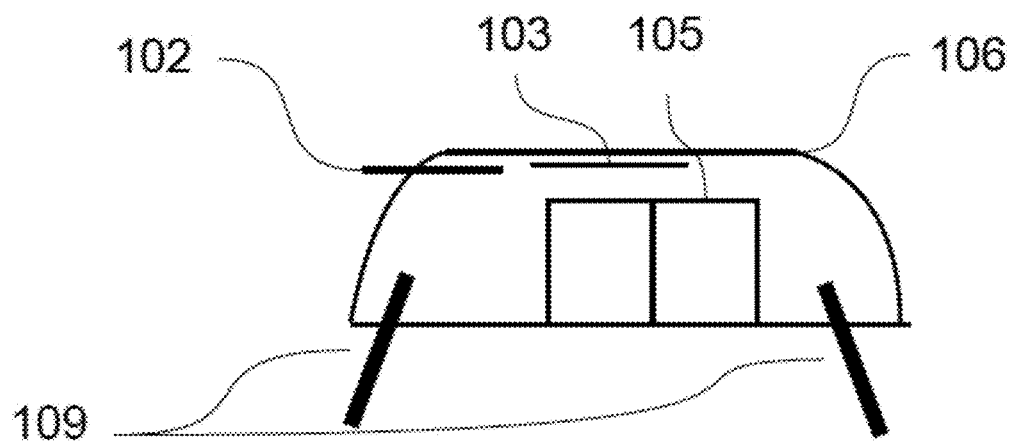
FIG. 7 illustrates an embodiment of the invention in which the drive system comprises legs.

Alternatively, in some embodiments, legs 109 may be used to support the system and provide motion and direction, as illustrated in FIG. 7. The programming to balance the system on legs as they "walk" may be more involved than the instructions needed to drive wheels (which are almost always in contact with the ground), but walking offers more flexibility for moving through very irregular terrain.

Figure 8:
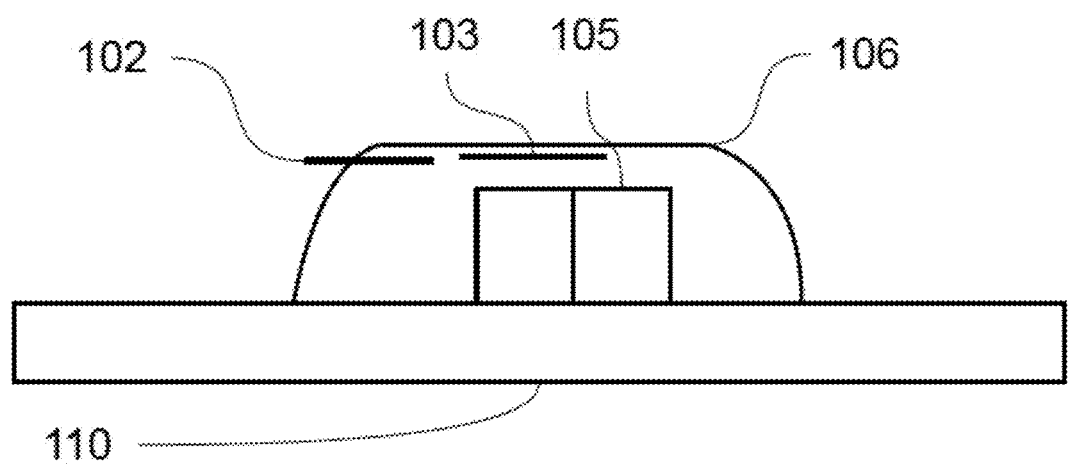
FIG. 8 illustrates an embodiment of the invention in which the drive system comprises a forced air "hover-lift" mechanism.

In alternative embodiments, motors that drive air downwards in a hover lift arrangement 110 may be used to allow the system to operate as a hovercraft, supported by a cushion of air, as illustrated in FIG. 8.

Figure 9:
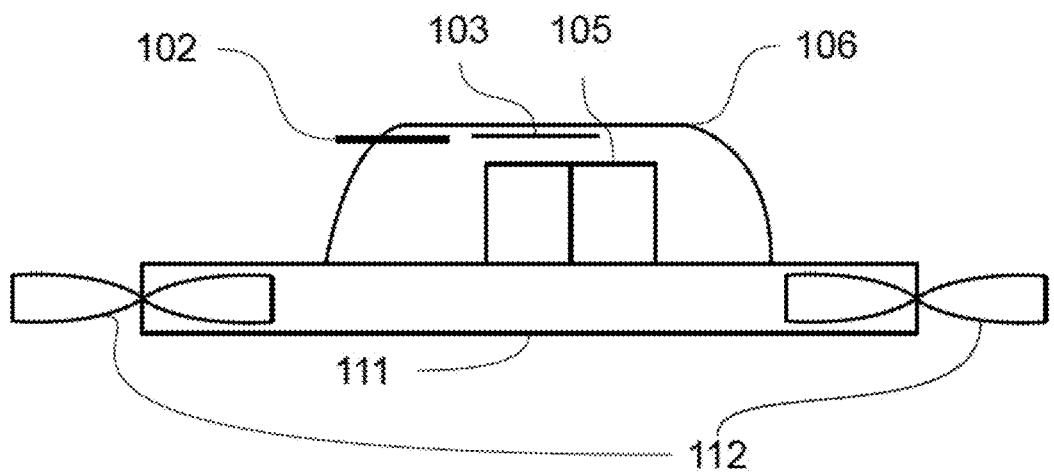
FIG. 9 illustrates an embodiment of the invention in which the drive system comprises several rotor-lift mechanisms.

In some embodiments, at illustrated in FIG. 9, rotors 112 to provide lift using a rotor-lift arrangement 111 may also be used to elevate the system above the surface, and differential drive for the various rotors may allow the system to move up or down, left or right, forward or backward, or any other combination of motions in three-dimensional space.

III.b. Alternative Options for the Battery

The system also comprises a power source. This power source could be a conventional battery, as in the embodiment described above, in which the battery was a deep cycle sealed lead acid battery or set of batteries. Alternative embodiments may comprise one or more of a lead acid battery, a deep cycle lead acid battery, a sealed lead acid battery, an absorbed glass mat (AGM) lead acid battery, a gel lead acid battery, a nickel-cadmium (NiCd) battery, a nickel-metal-hydride (NiMH) battery, a lithium battery, a silicon-mediated lithium battery, a lithium ion battery, an alkaline battery, or power systems comprising combinations thereof, as may be known to those skilled in the art.

Alternative embodiments may also comprise non-battery power sources, such as a fuel cell device, a flywheel energy storage system, or any number of alternative energy storage systems known to those skilled in the art. Alternative embodiments could have a system that converts chemical or other energies to electrical power such as a fuel cell, a hydrogen fuel cell, a hydrocarbon powered heat engine such as an internal combustion engine with a dynamo attached, a microwave transmission energy power source, an inductive energy source or a Carnot engine. Alternative embodiments could have combinations selected from any of the above storage system and any of the above conversion systems.

III.c. Alternative Options for the Computer

The above-described first embodiment had a Radxa Rock as the main computer board that additionally had software loaded onto a removable flash device and inserted in the flash socket, and also included on-board Wi-Fi provided. As will be understood by those skilled in the art a number of alternative microprocessors are possible including Intel architecture devices including Intel core i3, i5, i7 microprocessors or Intel Xeon products manufactured by the Intel Corporation of Santa Clara, Calif.; AMD brand microprocessors manufactured by Advanced Micro Devices of Sunnyvale, Calif.; ARM and ARM compatible variants including, Tegra processors such as the including Tegra, 3, 4, 5, K2, K3 provided by Nvidia of Santa Clara, Calif.; Snapdragon processors including, 800, 801, 805 provided by Qualcomm Corporation of San Diego, Calif.; Exynos Processors, 5420, 5410 manufactured by Samsung Electronics of Suwon, South Korea; OMAP Processors manufactured by Texas Instruments of Dallas, Tex.; Rockchip processors manufactured by Fuzhou Rockchip Electronics company of Fuzhou, China; Allwinner A10, A20 processors manufactured by Allwinner Technology of Zhuhai, China; or any other microprocessor known to those skilled in the art.

The microprocessors could be mounted in a number of different development boards including the Radxa Rock manufactured by the Radxa Corporation of Shenzen, China; Cubieboard manufactured in Shenzhen, China; the Nvidia K1 development kit produced by Nvidia Corporation of Santa Clara, Calif.; and various other single board computers supported by various foundations and organizations, such as the Odroid X1, X2, X3, X4, U1, U2, U3, U4 produced by Hardkernel Co., Ltd. of South Korea; Cubieboard; the PandaBoard; the Raspberry Pi 1, 2, 3, 3B+; and various motherboards and blades manufactured by conventional microprocessor suppliers such as Intel Corporation of Santa Clara, Calif. and Advanced Micro Devices (AMD) of Sunnyvale, Calif. Optional components for such boards include WiFi connectivity, cellular wireless connectivity, Ethernet connectivity, and other connectivity options that will be known to those skilled in the art. Data storage options may comprise non-volatile memory devices such as flash storage, hard disks, external flash sockets, and may additionally provide connectivity for various I/O devices, including monitors, video displays, audio output and the like.

In the above described first embodiment, software is loaded on to the device on a removable flash device and software updates are achieved by connecting to a cloud based computing systems over wireless connections using Wi-Fi protocols, as directed by an operator. In alternative embodiments this connectivity could occur using wireless cellular connectivity, or alternative wireless data transmission techniques that will be known to those skilled in the art. Software updates could occur automatically or manually. In the above-described first embodiment, processing tasks were carried out on the onboard microprocessor. In alternative embodiments these processing tasks could be shared with, or carried out by, auxiliary processing units, such as auxiliary microprocessors or graphics processing units (GPU). Such additional processing may also be provided by cloud based processing systems using web-based connectivity.

III.d. Alternative Options on Navigation System

The above-described first embodiment described a navigation system comprising LIDAR navigation using the Hokuyo UTM-30LX. Alternative embodiments using other LIDAR systems will be known to those skilled in the art. Alternative 2-D and 3-D range finding methods may also be used. Some embodiments may comprise 3-D cameras, such as the Xtion or Xtion Pro models produced by Asustek of Beitou District, Taipei, Taiwan; the sensor from an Xbox Kinect produced by Microsoft Corp. of Redmond, Wash.; or other alternative 3-D cameras that will be known to those skilled in the art.

Figure 10:
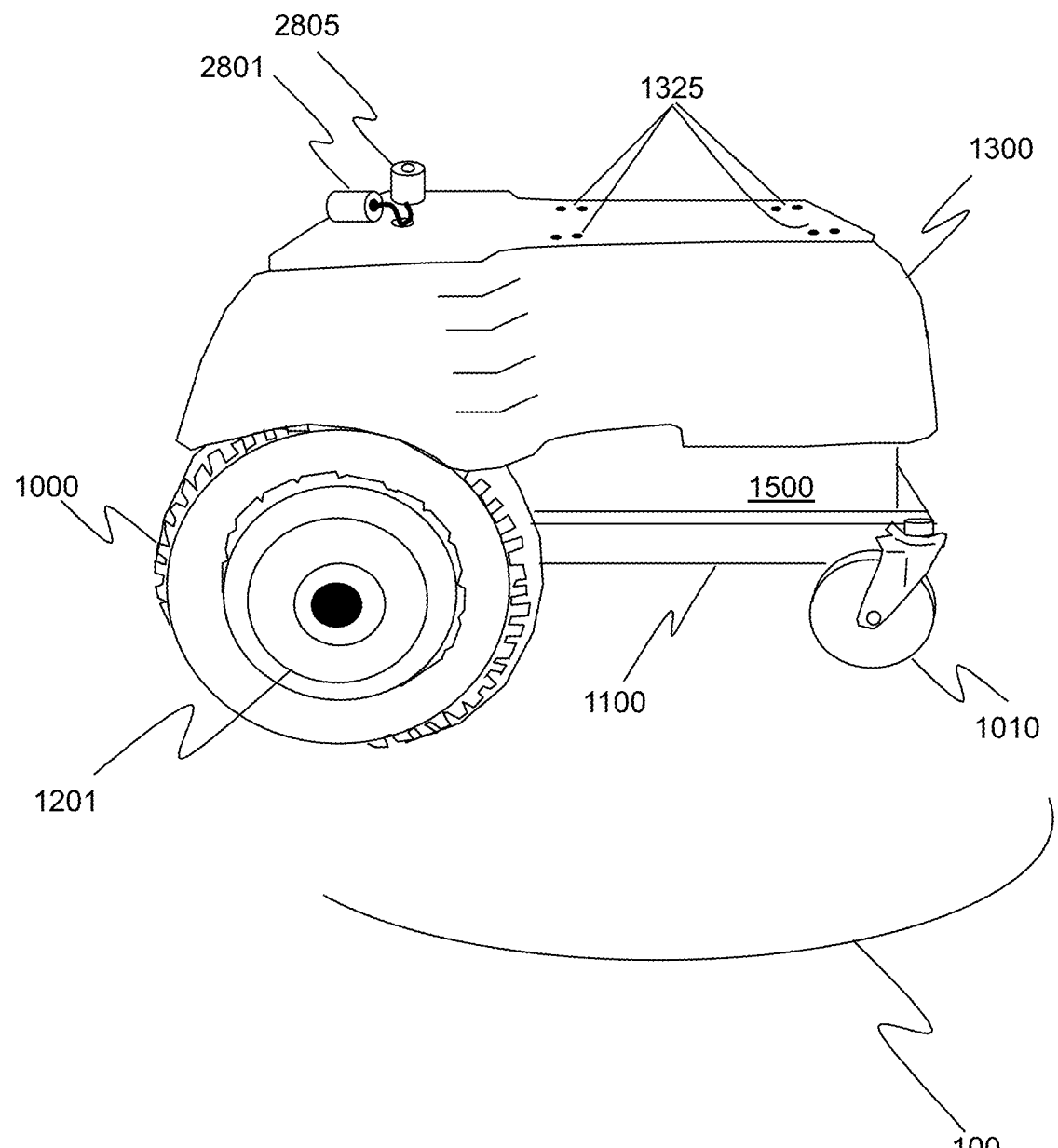
FIG. 10 illustrates a side view of an embodiment of the invention in which the navigation system comprises a pair of a pair of video cameras.

In an alternative embodiment, a system comprising two cameras may be used, one looking up and one looking ahead. This is illustrated in FIG. 10. These cameras may be conventional, commercially available cameras such as those found in cell phones for example the OV5647 model or any other image sensor model manufactured by Omnivision Corporation of Santa Clara, Calif., or the MT9M033 model or any other image sensor model manufactured by Aptina of San Jose, Calif., or common USB cameras such as the Logitech C170, manufactured by Logitech of Lausanne, Switzerland or others that may be known to those skilled in the art. The camera may be powered by either a local battery, or through a connection to one of the printed circuit boards. The camera signals in this embodiment will be provided by a wired connector to the computer 1700, just as the LIDAR signals were provided in the previously described embodiment.

In this embodiment, a horizontal camera 2801 faces forward, looking in front of the base unit 100. With suitable image processing, this can provide a certain amount of navigation information, such as determining if there is an object ahead to be avoided, or if there is a human being in the area that needs attention. In this embodiment, the second camera is a vertical camera 2805, which looks up. This camera can be used for navigation to a reference pattern. In one embodiment, the software governing the system will comprise a pre-programmed map of, for example, the patterns on a ceiling of a room. By watching the patterns with the vertical camera 2805 and correlating to this internal map, the robot may determine where it is and navigate accordingly. As will be understood by those skilled in the art, alternative embodiments may enable the system to navigate with a single camera, two cameras, or more than two cameras.

Alternative room sensing technologies may also be employed to provide information to the system about the local environment, such as the HC-SR04 ultrasonic ranging module manufactured by Cytron Technologies of Kuala Lumpur, Malaysia, or other scanning acoustic or sonar arrays.

In other embodiments, sensing technologies comprising range finding infrared devices such as designed by XYZ Interactive Technologies Inc. of Toronto, Ontario, or optoelectronic wide-angle distance measuring sensors manufactured by Sharp Corporation of Osaka, Japan; or light arrays that comprise arrays of light sources and light sensors configured to provide information about the room, or RADAR systems based on CW RADAR, and the like. In an alternative embodiment the room sensor will be a combination of one or more of the list of LIDAR, generalized IR sensor, sonar or RADAR.

Figure 11:
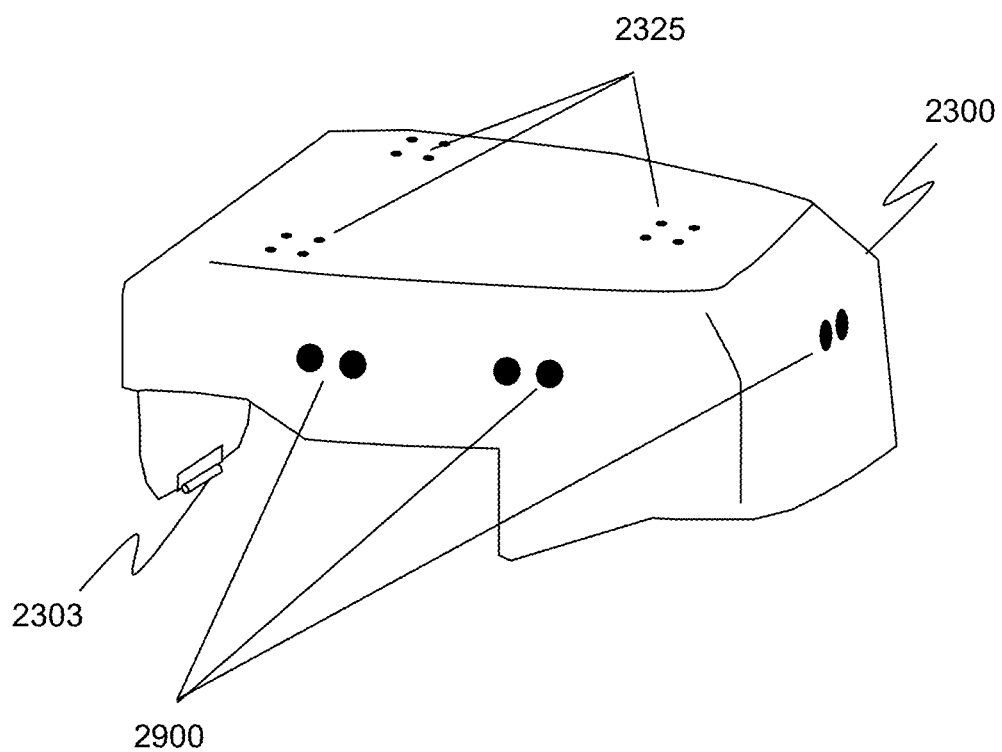
FIG. 11 illustrates a view the cover for an embodiment of the invention in which the navigation system comprises multiple sensor systems or multiple sensor devices used in an array.

In another embodiment, instead of having camera or LIDAR sensors mounted to the top of the base unit 100, configurations may be designed in which arrays of sensors are mounted on the inside of the cover 1300 of the base unit. A cover 2300 for such a unit is illustrated in FIG. 11. As in the previous embodiment, this cover is designed to attach to the chassis 1100 with a hinge 2303, and various holes 2325 in the cover have been provided to allow attachment of accessories.

However, in this configuration, one or more sensor systems are mounted inside the cover, and transmit and receive their signals through various apertures 2900 in the wall of the cover 2300. In this embodiment the signals may be ultrasonic signals or they may be visible or infrared light. The transmit and receive functions may act as individual pairs or they may act as an array of generators or sensors. In the case of the data being ultrasonic, the timing of the receipt of the signals may be gathered. In the case of ultrasonic or visible or infrared light the intensity of the returned signal may be gathered. In the case of these systems acting as an array, the data from these sensors would be communicated to the microprocessor 1701. The data would then be processed by applying an inverse function that would generate an internal representation of the environment, such as a room shape and size, from the sensor data. This inverse function may be an inverse matrix that would be applied to the set of incoming data organized as an input matrix and applied together using matrix multiplication.

The navigation system may further comprise additional electronics to manage the data from the room sensor. In a preferred embodiment, these electronics comprise a microcontroller, or in alternate a computer system. In such an embodiment the computer takes in data from the sensors and executes a set of instructions in a predetermined sequence that seeks to match the sensor data to a location in a pre-stored electronic map thus determining its location in that electronic map and thus using this information to make decisions about where to go in that map. In another embodiment, the navigation system shall contain a camera and shall use, either alone, or in concert with the computer system, the camera to recognize either fiducial markings, people, or other objects in the room as a reference for navigation purposes. In this embodiment the images are matched to images stored in a pre-stored map. In an alternative embodiment of the invention the camera may be used such that the robot is directed to navigate towards people in order to provide service.

In other embodiments the system may navigate using data derived from the wheel encoders and may combine this data with data from other sensors on the robot or other systems already described to make a decision to direct the movement of the system. In this embodiment the microcontroller 1627 would report to the computer 1700 data derived from the encoders, this information may include the position of the wheels, the angular distance moved by the wheels or the speed of the wheels. The computer would use this data to make a decision directing the motion of the system and may combine this data with data derived from other sensors on the robot.

The navigation system may also comprise an algorithm to take input data from the available sensors on the robot and direct the motion of the robot in a space. The navigation decisions may be made by reference to a pre-stored map, or the navigation map may be constructed by the robot while it navigates. The navigation decisions may be made in reference to pre-stored criteria, such as a goal to move towards an object that has been detected by the cameras and recognized by a computer that has loaded upon it a set of instructions that constitute a vision recognition algorithm. The pre-determined criteria could be to move towards or away from a sensed object, temperature, light gradient, scent, sound, ultrasonic sound, hypo-sonic sound, electromagnetic signal or gradient, physical disturbance, tactile stimulation or any other thing that may be sensed by sensors know to those skilled in the art. A combination of these criteria may be used, to make a navigation decision or a combination of these criteria and a map may be used to make a navigation decision.

III.e. 3-D Environmental Imaging System

III.e.1: Background

Mobile robotic systems need to be able to sense their environment in order to be able to move in it. Mobile robotic systems may include: ground based rovers, multi-roter drones, fixed wing robotic systems, sea surface and subsurface robotic craft and others that may be known to those skilled in the art. Specifically ground based robotic rovers, such as those described elsewhere in this Application, must have the ability to localize (determining its location in space) and navigate (finding its way through the space) which requires, among other things, obstacle avoidance (seeing where obstacles are in space so that collisions can be avoided).

In order to be able to perform these functions the robot needs to have the ability to measure the distance to walls, and other objects. Furthermore, there are use cases where robots may need to detect and/or recognize objects, using information processing algorithms, such as neural net algorithms, Bayesian inference algorithms or other algorithms known to those skilled in the art in order to interact with them, or make decisions based on the presence or lack thereof of those objects.

The normal way to do this, as was discussed above, is to deploy a LIDAR such as systems produced by Hokoyu, SICK or Velodyne. LIDAR are systems that scan the walls using a laser beam and then use the time of flight of that laser beam to determine the distance to the walls. LIDAR are problematic, as they require complex mechanical assemblies to rotate their sensors. These assemblies must be precision machined due to the mechanically demanding nature of the task. As such, they are expensive and difficult to construct in a way that is robust to all environments in which a robot may be utilized.

They also suffer from another very significant flaw in that they require clear line of sight from the LIDAR to the walls. No matter where you place a single LIDAR on a robot, if the aforementioned LIDAR is able to scan in 360 degrees then some portion of the LIDAR trace will usually strike either the robot unless a special place can be found to mount the LIDAR high above all other parts of the robot, something that is not always convenient. Some place multiple LIDAR to get a broader field of view, but this is expensive and complex.

To ameliorate the difficulties of having precision optics, some construct LIDAR that use triangulation mechanisms (e.g. the LIDAR supplied by NEATO in their XV-11 robotic vacuum cleaner). This LIDAR is simpler mechanically, but still requires an unreliable rotating mechanical system and is relatively costly. It also suffers from the same problems of rotating LIDAR impinging on parts of the robot.

Some attempts to reduce the difficulties faced with LIDAR include using a time of flight arrangement with LEDs in a rotating system, such as those provided by Rhobey Dynamics. However, such a system also suffers from the same problems of rotating LIDAR impinging on parts of the robot.

A system that avoids the use of mechanical devices to scan the environment, and that can be deployed at a lower cost, can provide greater information about the environment can therefore provide significant advantages.

III.e.2: Time-of-Flight Sensors

Figure 12:
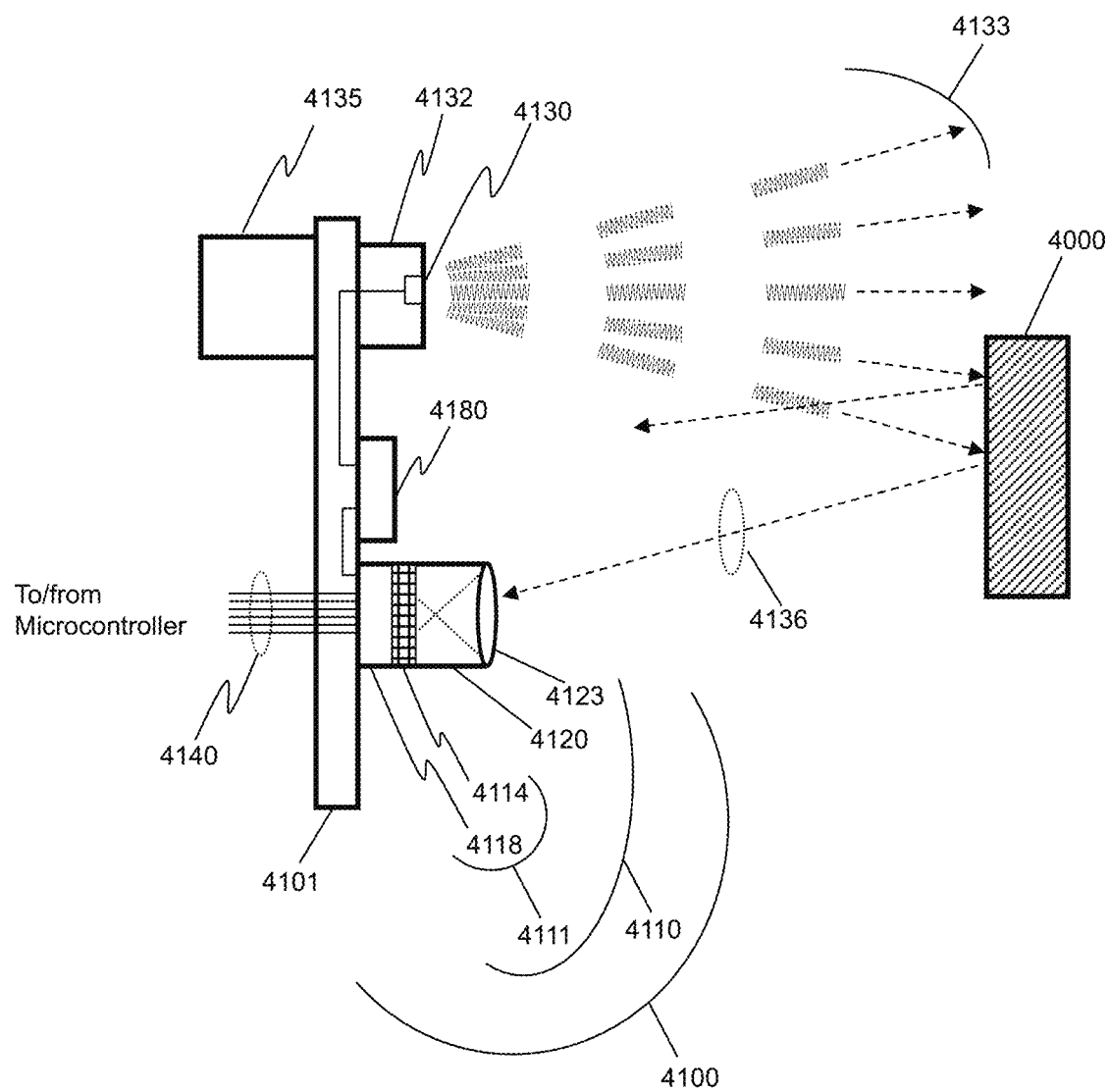
FIG. 12 illustrates a schematic example of a time-of-flight (TOF) camera module.

Recently several semiconductor companies (for example, Texas Instruments and Infineon) have released camera electronic products for gesture recognition to control, for example, in-car audio for the automotive sector. A camera module 4100 that may use such products is shown in FIG. 12. The camera module 4100 may comprise a printed circuit board 4101, on which are mounted a camera 4100, one or more LEDs 4130 with LED electronics 4132, and control electronics 4180. A connector 4140 connects the device electronically, using, for example, a ribbon cable, to a microcontroller on a separate board.

These systems work as follows: the area is illuminated with one or more light emitting diodes (LEDs) 4130. The LEDs 4130 are modulated with a signal originating with the camera electronics 4118 and processed by the control electronics 4180, such that the LEDs 4130 are flashing on and off at frequencies between 20 MHz and 40 MHz (note: this description is not intended to be limiting; a much wider range of modulation frequencies may be used, with longer ranged possible at a lower frequency, e.g. 1 kHz to 200 MHz). A heat sink 4135 may be present to disperse generated by the operation of the LEDs 4130.

These pulses of light 4133 travel away from the LEDs 4130 and illuminate one or more objects 4000 in the surrounding environment. Light that originated from the LEDs becomes returning light 4136 once it is back-scattered or reflected from the neighboring object(s) 4000 and returns to the camera 4110. The camera 4110 comprises a lens 4123 mounted in a lens mount 4120 positioned to form an image of the returning light 4136 onto a camera sensor 4111 comprising a 2-dimensional array of optical sensors 4114 and related camera electronics 4118.

When the modulated light comes back to the camera sensor 4111, each pixel of the 2-D sensor array 4114 is made up of two wells. The 20-40 MHz electronic signal from the camera electronics 4118 that was used to drive the modulation of the LEDs 4130 also switches which well is active, and so light either is accumulated on one well or the other. When the detected signal from the light is in phase with the modulation, all the light accumulates on one well, and when the detected signal from the light is out of phase, the light accumulates on the other well. When the phase is somewhere in between it accumulates partly on one well and partly on the other. By measuring many pulses, it is possible to measure the phase difference between the emitted light and the returning light for each pixel, and so it can be determined how far away objects are based on how long it takes for the pulses of light to return.

Components for such "time-of-flight" (TOF) measurement systems, such as the Texas Instruments OPT 8320, are commercially available. These commercial TOF systems are used for short range (typically less than 1 meter) sensing and typically cover a field of view of around 60 degrees with frame rates of around 30 frames-per-second (fps). This is adequate for the gesture sensing uses for which they were originally devised. Such a high frame rate is needed for gesture recognition.

Some embodiments disclosed with this Application utilize this type depth-sensing camera and seeks to enhance its normal configuration in a number of ways to extend its range and precision, and then make use of the return data as a substitute for a more complex LIDAR system.

In some embodiments, for better detection of the environment of a robotic platform, a field of view greater than 180 degrees may be required. Further, such an environmental sensor may be constrained by the amount of light they are able to emit, gather and measure. As such, as will be known to those skilled in the art, it is difficult to produce a sufficiently wide-angle lens that also has a large aperture to gather a lot of light. It therefore may be advantageous to use more than one lens and sensor (the combination that is referred herein as a "camera"), with the multiple lens/sensors units pointed in multiple different directions in order to be able to get an adequate field of view that creates a complete representation of the distance to the objects in the environment around the robot.

The modulated illumination must be of adequate brightness to illuminate the surroundings of the robot. For a range of 1 meter or so, a single illumination source may be adequate, especially if it is of high brightness. However, to illuminate more distant objects in the environment, multiple LEDs may be used in order to provide more illumination and extend the range. As will be appreciated by those skilled in the art ensuring synchronized turn-on times can become significant in this application, and in a preferred embodiment a set of LEDs may be electronically synchronized with a single driver to ensure that they all are modulated together.

In a preferred embodiment, between 6 to 14 high power LEDs (e.g. the SFH 4714A from OSRAM, emitting at 850 nm) per each camera may be used in series to ensure simultaneous operation. At 24V, the series will consume 1 to 2 Amps instantaneously. High power LEDs can generate a significant amount of heat, and so it is preferred that the modulation duty cycle be kept quite low (20%) to avoid excessive heat generation, and the PCB 4101 will have to be designed with thermal considerations in mind. In some embodiments, mounting the LEDs 3160 to either a passive heat sink 4135 (e.g. a block of aluminum) or an active heat dissipation device (e.g. a heat pipe or a Peltier cooler) may be advantageous.

III.e.3: 3-D Imaging Camera

Figure 13:
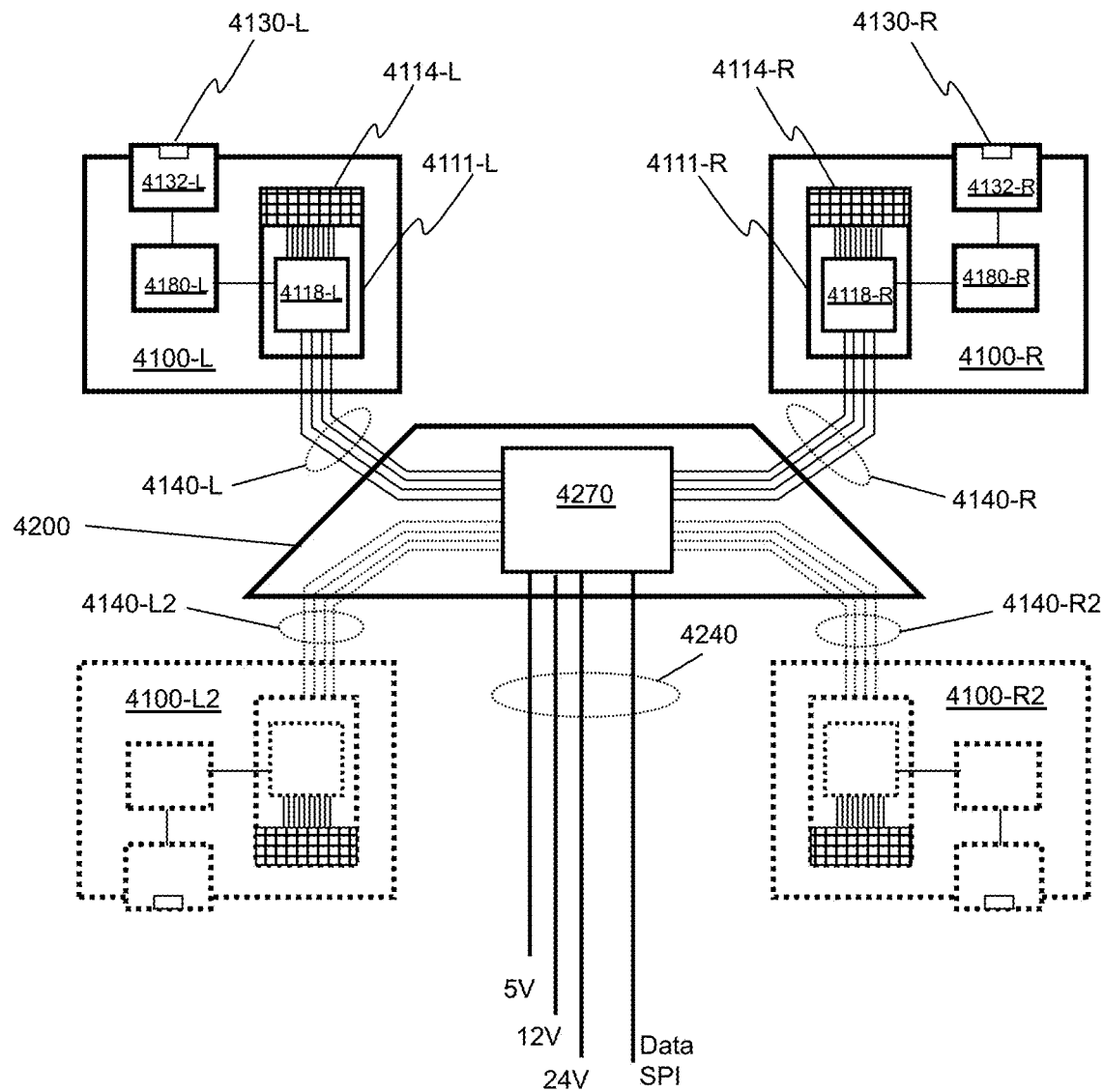
FIG. 13 illustrates a block diagram of an embodiment of a 3-D imaging system comprising at least two time-of-flight 3-D camera modules as used in some embodiments of the invention.

A schematic block diagram of a distance sensor system as may be used in some embodiments is shown in FIG. 13. In a preferred embodiment, a distance sensor system may comprise two (2) or more time-of-flight camera modules 4100-L and 4100-R (suffixes -L and -R are used in FIG. 13 to indicate corresponding elements of the two camera modules throughout). Each camera module provides the electronic output from array photosensors 4114-L and 4114-R through the connectors 4040-L and 4040-R to a microcontroller 4270 on a separate control board 4200. Each TOF camera module 4100-L/R may have one or more LEDs 4130-L/R to provide illumination, and a camera 4110 (comprising a lens and sensor array unit) to detect the returning light. In a preferred embodiment, the camera modules 4100-L/R would be positioned to have fields of view that overlap, so that a complete picture of the environment without gaps may be constructed. The distance sensor system may be designed to allow additional camera modules 4100-L2/R2 to be attached using connectors 4140-L2/R2 to the microcontroller 4270 as well, so that a larger field of view may be obtained.

In a preferred embodiment, the distance sensor system would be designed to connect through power/data connector 4240 to the computer on the robot itself. In some embodiments, the computer would preferably be a modified Raspberry Pi 2 or Raspberry Pi 3 with a corresponding header. The header would be identical to the typical Raspberry Pi header, but would also have additional pins to supply several amps of 24V and 12V power to the camera in addition to the 5V power that is already specified for the Raspberry Pi. As will be understood by those skilled in the art, the device could be connected to other compute boards on the robot as well. Data connection to the Raspberry Pi may be made either through a Serial Peripheral Interface (SPI) or through a Universal Serial Bus (USB) connection. Power may be provided from the robot in 5V, 12 V and/or 24V supplies.

In a preferred embodiment, the distance sensor system would control at least two camera modules. Each additional camera would be attached through a daughter cards to the main board of the subsystem, and this main board would also have a header to connect two additional sensors. The main board of the subsystem comprises a microcontroller that collects data from the camera modules and may do some signal processing (e.g. some degree of data reduction or arithmetic operations) before consolidating the data and sending it to the Raspberry Pi main processor. The microcontroller would also deal with all the interface operations to the lens/sensor and the camera module LED drivers.

In a preferred embodiment, each camera module would comprise an OPT8320 sensor (produced by Texas Instruments), LED drivers, and illumination LEDs.

In a preferred embodiment, the motherboard would comprise a microcontroller having some or all of the following properties:
a) Ability to interface up to 4 OPT8320 sensors;
b) Ability to support both SPI and USB;
c) Ability to handle data flow and do basic data processing; and
d) Ability to operate in a protected memory mode, such that it is possible to program the microcontroller with firmware before delivery, and such that the firmware cannot be removed from the microcontroller.

In a preferred embodiment, the microcontroller is able to communicate with a main computer on the robot that handles the robot's executive functions. In a preferred embodiment, this main computer would be a Raspberry Pi 3B+ (manufactured by the Raspberry Pi Foundation) and can communicate at a suitable speed over SPI. In a preferred embodiment, the full-take data acquisition rate in megabit per second (Mbps) from 2 sensors at 24 fps or full-take data acquisition from 4 sensors at 12 fps may be estimated using the following:

2 sensors×24 fps×32 bits per pixel×60 pixels high× 80 pixels wide=7.3728 Mbps

This data rate is close to the limit of the 10 Mbps of the SPI standard, and very close to the 7.5 Mbps limit of the Raspberry Pi 3 that arises from the computer's clock tree. Therefore, for a computer to operate Linux at the correct speed, a preferred embodiment may require a kernel module.

In some embodiments, the microcontroller may be an ARM M4 architecture, but as will be known to those skilled in the art many different architectures will also be feasible.

Some embodiments may have an LED switching system associated with each sensor chip. This LED switching system can accommodate between 6 to 14 LEDs when the system is provided with 24V battery power. Such a system may deploy one or a plurality of strings of LED devices, with the total assembly comprising between of 6 and 14 LEDs together utilizing a 24V power supply. However, alternative embodiments may use higher or lower voltages, and may deploy alternative illumination schemes including LED, Lasers, and potentially even gas discharge illumination schemes with LCD systems for modulating the illumination.

Some embodiments comprise multiple boards. For example, a configuration with two camera modules would have three boards: one for the microcontroller and one daughter board for each OPT8320 and LED camera module. Having daughter boards for each camera module enables the device to meet the form factor requirements specific to robots. By placing multiple daughter boards on several points on the exterior of the robot and then connecting them via cables to the microcontroller board, it becomes possible for the system to provide greater than a 180 degree field of view without impinging on any robot hardware, and thus enables the system to be useful for navigation purposes.

In some embodiments, it is desirable to have the LED and the optical array sensor on the same PCB daughter card, arranged with a compact layout design to shorten connector distances and reduce the signal degradation in high power high frequency electronics.

Some embodiments may utilize an "Emergency Stop" pin in the connector raise a signal on the main computer in certain circumstances.

In some embodiments, the system may support built-in-self-test (BIST) functionality. There are two possible uses for BIST:
1) Testing at the factory, when the unit is first built. This avoids the need to create a separate test board; and
2) Testing in the field, so that the robot can see if it is still functioning as desired.

Preferred embodiments comprise a circuit design that:
a) Can handle 2 to 4 time-of-flight (TOF) camera modules such as the OPT8320;
b) Has an built-in microcontroller that does elementary data processing;
c) Has built-in BIST capability;
d) Has a general purpose input/output (GPIO) rail for Emergency stop.

The full system will also require a sequence of instructions that can be executed by a computing machine, i.e. software/firmware will typically be required. Specifically there may be a need for:
e) Microcontroller firmware (firmware);
f) A non-kernel driver for the Raspberry Pi that supports both USB and SPI mode (driver);
g) An SPI mode kernel module (kernel-module).

The firmware/driver/kernel-module is the expected typical architecture.

Additionally, some embodiments may also have software that enables the data to be connected with the display circuits of a computer to enable the data to be viewed, as well as software to connect the data to other portions of the robotic system to enable those systems to make decisions based on the data acquired. In a preferred embodiment visualization may occur with RViz (a visualization package in ROS (Robot Operating System) maintained and supplied by the Open Source Robotic Foundation).

In some embodiments, SPI may be used for the connector interface. For some embodiments, universal serial bus (USB) may be used as the connector interface. This may be important if connection to computers other than a Raspberry Pi series device is desired or if the time of flight system needs to connect to a different kind of robot or a different kind of device or is manufactured and sold as an independent device. In the preferred embodiment USB is avoided with the Raspberry Pi as it tends to consume a lot of processor cycles just to interface to it. Furthermore, mechanically it is much better if we can interface to the Pi header without using a USB.

III.e.4: 3-D Imaging Camera Sensor Data Analysis

The sensors in the camera module(s) may generate various types of data. For example, the preferred embodiment OPT8320 generates 32 bits of data from each pixel. This data can be broken down into:
12 bits of amplitude data;
4 bits of ambient data;
12 bits of phase data; and
4 bits of flag data.

Some embodiments may provide a communication mode that provides all the raw data from the sensors to the main computer (e.g. the Raspberry Pi). But, in some embodiments, the microcontroller is able to forward just a subset of this data, for example, only the amplitude data or only phase data, to the main computer to save data transmission bandwidth and main computer processor cycles.

For the data processing that occurs on the microcontroller, in general with a robot you need to be able to detect where the walls/obstacles are. With a 3-D imager this creates problems, such as that illustrated in FIGS. 14A and 14B.

Figure 14A:
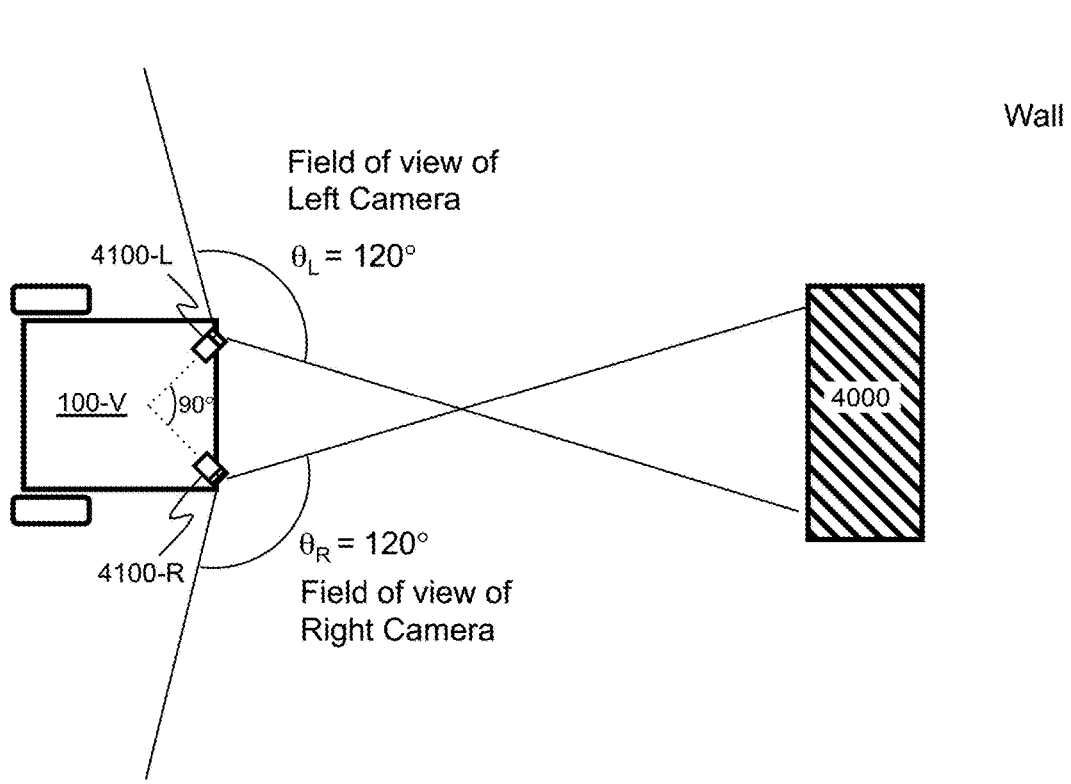
FIG. 14A illustrates a top view of an example of an obstacle detection problem encountered by a robotic system.
Figure 14B:
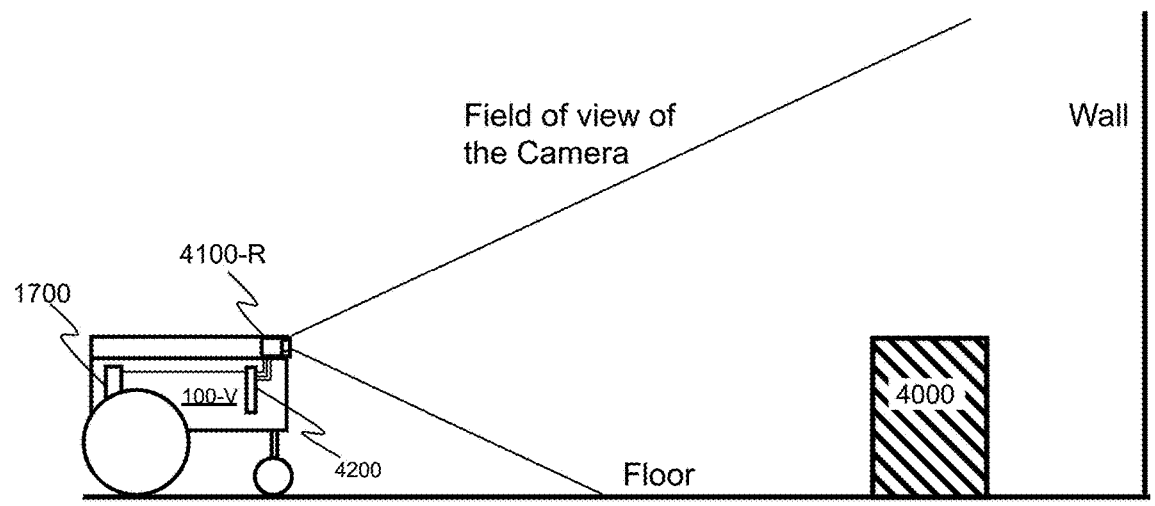
FIG. 14B illustrates a side view of the obstacle detection problem of FIG. 14A.

FIG. 14A illustrates a view from above of a robot with a TOF imaging system 100-V (which may be similar to, or different from, the previously described base unit 100) encountering an obstacle in its field-of-view, while FIG. 14B illustrates a view from the side of the same situation. The robot 100-V has at least two camera modules 4100-L/R connected to a control board 4200 having a microcontroller, which in turn is connected to an on-board computer 1700 on the robot 100-V. Usually, the field-of-view will encompass parts of the floor, parts of an obstacle, and also open space, in this example, the open space above the obstacle. So if the distance to the obstacle is to be determined, it is necessary to process the return signals from the sensor array to determine where the obstacle is.

III.e.4.a: Slice Mode

Figure 15A:
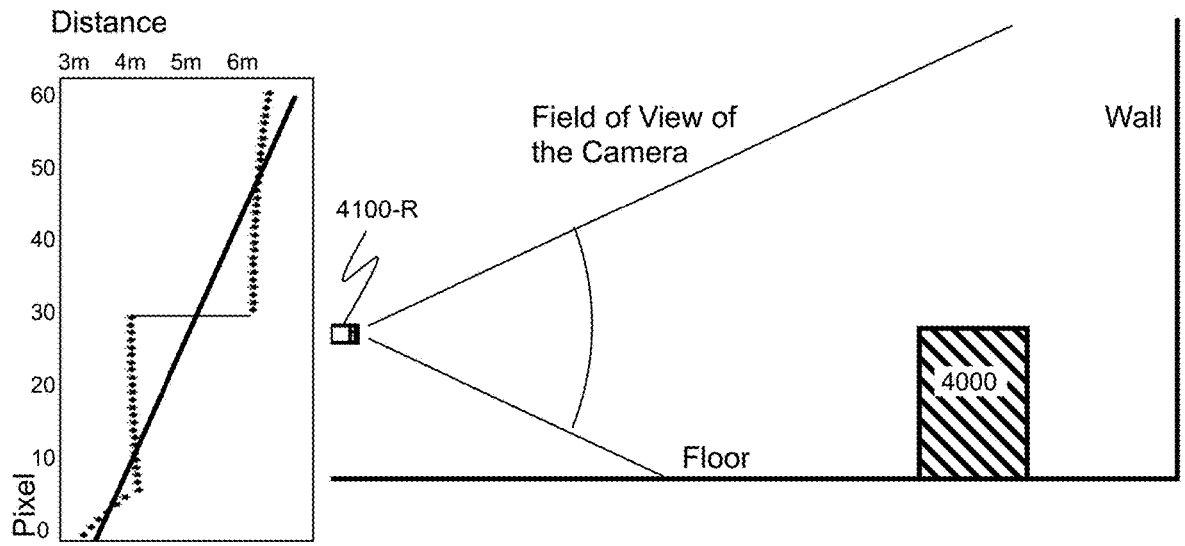
FIG. 15A illustrates the obstacle detection problem shown in FIG. 14B, along with a representative plot of the distance signals from a single vertical column of imaging elements from the 2-D imaging array, along with a fit of those distance signals with a single line.

FIGS. 15A-15D illustrate a simple method for estimating the distance to an object. In FIG. 15A, the obstacle problem such as was shown in FIGS. 14A and 14B is shown, along with a plot of a representative signal from a vertical column of pixels from the camera array. Distances, as determined by the TOF system, from the wall are farther away, while the object returns signals that are nearer, and the floor returns signals that are progressively closer to the array.

Rather than processing all raw pixels, algorithms to estimate average distances may be used to save computer cycles. Shown also in the plot of FIG. 15A is a straight line fit to the data. If all pixels have signals that are roughly the same distance (i.e. the variation in distance is smaller than some predetermined standard deviation, or the slope of the fitted line is approximately vertical), the average value would represent the distance to the far object/wall, and no further processing is needed. However, in this situation as illustrated, the straight line fit does not have a vertical slope, and therefore it can be inferred that multiple objects are multiple distances away, and further processing is needed.

Figure 15B:
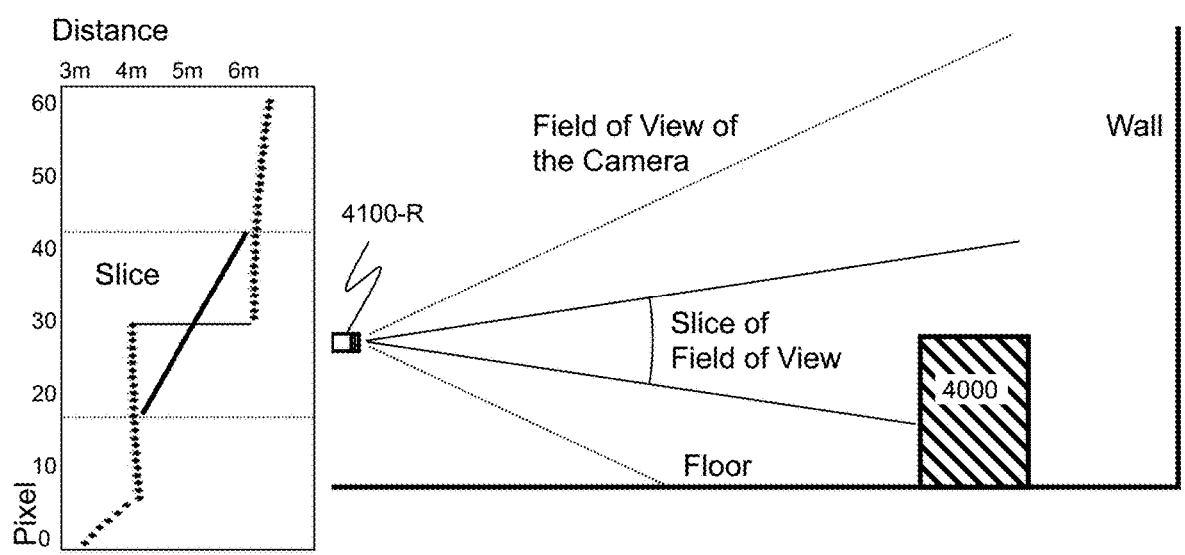
FIG. 15B illustrates fitting a central slice of the distance signals of FIG. 15A with a single line.
Figure 15C:
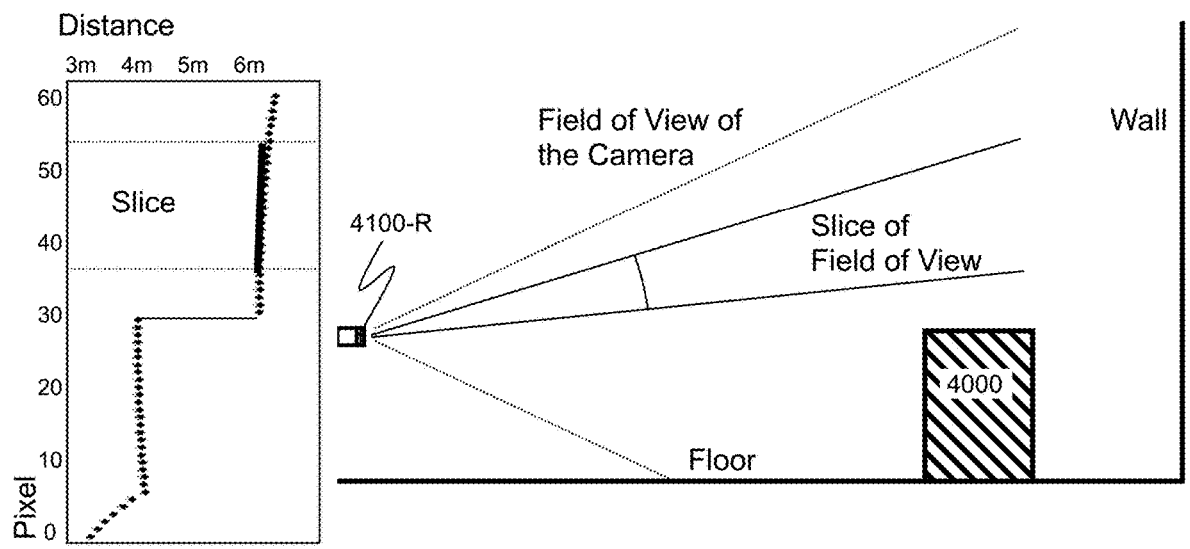
FIG. 15C illustrates fitting an upper slice of the distance signals of FIG. 15A with a single line.
Figure 15D:
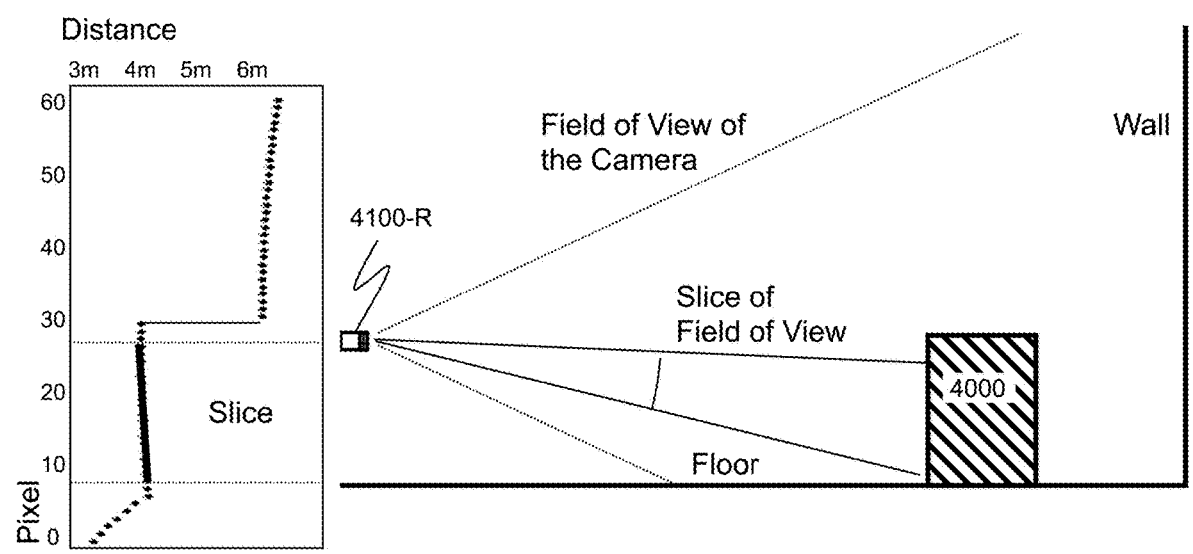
FIG. 15D illustrates fitting an lower slice of the distance signals of FIG. 15A with a single line.

In FIG. 15B, only a slice of the field of view from a single column of sensors in the sensor array. The slice may be one pixel high or several pixels high. The computation is then carried out again to determine whether the distances in the limited slice are also vertical. In the case of the central slice of FIG. 15B, the plot shows they are clearly not vertical. In the case of an upper slice (FIG. 15C) or a lower slice (FIG. 15D), near-vertical slope may be computed, and distances to objects inferred. This "Slice Mode" is a computationally efficient way to determine the distance to the wall. However, since the wall may be of varying distances and varying heights, determining the size of the slice to use presents some issues.

Although this illustration has referred only to a single vertical column of pixels, two, three, or more columns may also be combined and fit in a similar manner to identify objects and determine the distances to the objects.

III.e.4.b: Wall Detect Mode

A preferred embodiment also includes a mode that will analyze the sensor data to make a determination of the presence of a wall and the distance from the robot to the wall. A "wall detect" mode is any mode that attempts to take in 3-D data and return distance values corresponding to obstacles that may be around the robot. In a preferred embodiment, a wall detect mode takes a 3-D data-stream and reduces it to a 2-D data stream showing the distance to all obstacles around the robot. Such a wall detect mode may use deep neural nets, inference, machine learning algorithms, or other data analysis methods known to those skilled in the art.

In general, walls and other obstacles are flat. It is also notable that the signals provided by the sensors will usually have a Gaussian noise distribution. A least squares fitting method may be used to fit a line to the location of the obstacle detected within a column of sensor output signals. This may be used as the algorithm described above relating to FIGS. 15B-15D.

The problem with taking an average line to fit an entire column of signals from the sensor array for the situation described above is that it will try to fit distances from places that are far away (at the top of the illustration, where there is no obstacle), from the obstacle itself, and from the floor closer to the robot. The fitted line will therefore be tilted, and not corresponding to the actual position of the obstacle, as was shown in FIGS. 15A and 15B.

Therefore, a procedure to reduce the data to determine an accurate distance to an obstacle is in order. One possible procedure is to iteratively remove portions from the top and bottom of the data from the sensor array until the line is either vertical, or simply straight, and may use, for example, a Random sample consensus (RANSAC) algorithm. One possible approach to determine how much should be removed is to compute the residual, which is the sum of the squares of the differences between the fitted line and the actual measurement of distance from the column of the array. A smaller residual will indicate a better fit.

However, if more points are used in the computation, the larger number of points will lead to a greater value for the residual. To address this, some algorithms used in some embodiments may divide the residual by the square of the number of points used in its computation. Furthermore, because higher intensity points have a better signal-to-noise ratio, some algorithms used in a figure-of-merit computation may have a weighting function for the value of each pixel determined by the intensity of the signal received in that pixel.

So the figure-of-merit function metric (G) is described by:

$$G=(1/n^2)\Sigma((L-A)^2/I)$$

where n is the number of pixels to be fit, L is the value of the fitted line at a given point, A is the actual measured residual at that point, and I is the intensity.

The ideal line for a vertical wall will have the minimum value of G.

After making an initial estimate of the figure-of-merit, the algorithm can proceed by iteratively removing pixels from the top and bottom of the line, and recalculating the figure-of-merit G. Subsequent iterations will fall more on the actual obstacle, reducing the value of G. Variations that may be intelligently determined by selecting regions in the upper part or the lower part of the array pixels may also be used.

A number of other optimization algorithms may be applied to the search, such as a Golden Section search, Brent's Method, search with first, second or n derivatives, downhill simplex method, Powell's method, conjugate gradient methods, variable metric methods, linear programming, simplex method, simulated annealing, or Markov chain Monte Carlo methods may be all be used, individually or in combination, to find the best value for G.

A fitted line with minimum G will most likely represent the position of a wall. Computation of the intercept of the line will produce the wall distance from the sensor. For the purposes of the intercept, if the x=0 point is defined as a point on the field of view—it needs to be a user alterable parameter.

A possible protocol proceeds as follows:
a) Select a vertical line of data (60 points). A weighted (weight by intensity again) least squares fitting algorithm will give you ax+b (the fit line parameters) for this line, then compute only b plus the figure-of-merit metric G;
b) Chop off some of the top and bottom of the line of data points. Use a two-dimensional optimization technique (Markov chain, Newton minimization or something else) to find the point of cutting from the top and bottom where the figure-of-merit metric G is minimized;
c) Return the value b for that set of data and the figure-of-merit metric G.

The proposed pseudo-algorithm is actually computationally very efficient, and can be computed in very few cycles. 2-D Newton minimization usually only takes very few iterations and the goodness index is very simple, yet it is extremely rigorous in isolating the most probable nearest obstacle with high accuracy in a model of Gaussian noise and obstacles that may be finite and unknown height and undetermined distance away.

ARM M4 microcontrollers at speeds up to 168 MHz are inexpensive, and this procedure need be only be carried out on 160 sets of data 5 times per second, and there are a couple hundred thousand cycles to execute this. As such, this type of data processing can yield useful data, but only the useful data without absorbing compute cycles from the main computer.

In some embodiments, the firmware and driver should be able to transmit in both raw data mode (all data coming from the OPT8320) at a selectable frame rate; and also transmit processed data such as in a slice data mode at a selectable rate and/or in a wall detect mode at a selectable rate.

Other embodiments may include combinations of raw data and processed data, for example:
a) Raw intensity data+slice data;
b) Raw intensity data+wall detect data;
c) Other combinations of the above.

III.e.5: Emergency Stop Action

The 3-D time of flight camera is likely to be able to detect things that are dangerous to the robot. In particular it is likely to detect when the robot is going to go off a cliff (cliff sensing) and when it has collided or will collide with a wall (collision detection).

For cliff sensing, if it detects that there is no-floor in front of the robot, it ideally should raise an emergency stop signal. Likewise, if it detects that there is a wall directly in front of the robot, it should similarly raise an emergency stop signal. In some embodiments, the microprocessor can have a number of user specifiable E-stop actions. These would include looking at a region of the 3-D image and determining if the region is either farther (for cliff sensing) from a user specifiable distance, or closer than a user specifiable distance (collision detection) and then raising a level in a GPIO on the main computer. In some embodiments, a GPIO would halt all other processor activity and send an emergency signal to the motor controller to halt any driving.

III.e.6: Additional Imaging System Variations

Some features a) through g) that may be supported across the software/firmware stack:

a) The OPT8320 sensor should support different frequencies and different duty cycles, as well as different frame accumulation configurations. The range of frequencies, duty cycles accumulate configurations need to be supported in the firmware and in the drivers that need to be written for the Raspberry Pi. Ultimately performance needs to be tuned. There may even be situations where this could be dynamically reconfigurable by application software communicating with the driver.

b) Drivers that are written for the Raspberry Pi may be modified to turn them into ROS nodes, so code needs to be clearly written with an application layer driver. ROS operates completely in the application layer.

c) Three different categories of data return need to be supported with the option in the code to support up to five more types. These data return modes are:
(1) Raw data type: all the data that is coming from the OPT8320 sensors in use or subsets thereof;
(2) Slice Mode: a mode that takes a slice of datapoints and averages them to return only one distance for each horizontal line of distance points; for example, "average everything between lines 10 and 20 and return a single distance".
(3) Distance-to-Walls Mode: all the data supplied by the sensor is used to estimate the distance to the walls. This uses all the data supplied to make this estimate with a higher signal to noise and thus accuracy than is possible with the single line mode.

d) Delivery of full-take mode and single line mode at 24 fps.

e) Delivery of distance-to-walls mode at 5 fps with combinations of raw and processed data.

f) E-Stop action (as discussed above).

g) The capability for over-the-air updates with encryption, i.e. depositing an encrypted firmware update to the driver to the microprocessor.

As will be understood by those skilled in the art, firmware for the microcontroller enabling all 3 modes should be programmed on to the microcontroller. Software for the Raspberry Pi on the robot that allows us to analyze and act on data coming from the sensors should be provided. This is expected to consist of a kernel module and a separate non-kernel driver. The driver should be able to make the system work with either SPI+kernel module or USB without a kernel module. The basic setup to prove that the driver functions as expected (e.g. pipe the data out of the driver to a display program such as RViz) may also be provided.

III.e.7: Robotic Integration

Figure 16:
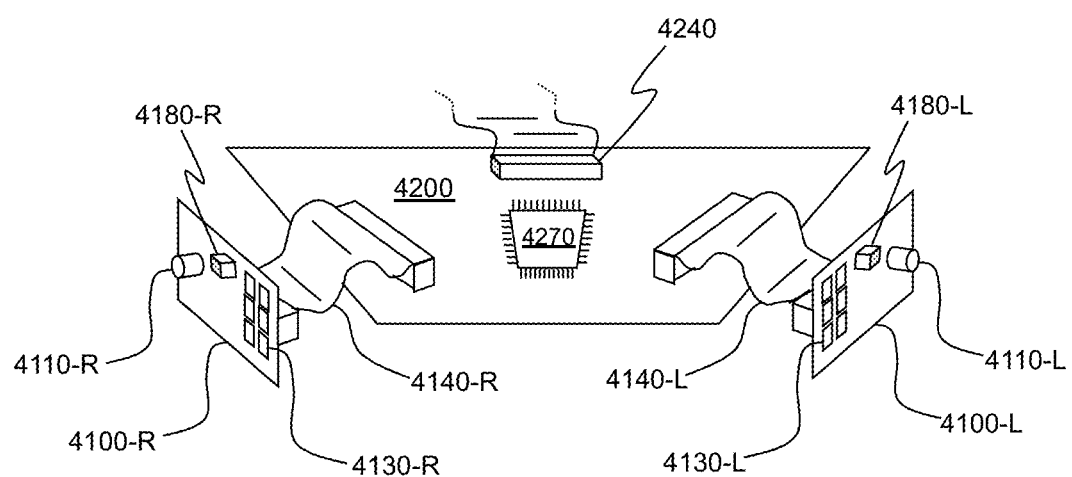
FIG. 16 illustrates a perspective view of a 3-D imaging system comprising at least two camera modules and a microcontroller board as may be used in some embodiments of the invention.

A diagram showing an example of a distance sensor system that may be used as a robotic 3-D environmental sensing system is shown in FIG. 16. The system as illustrated comprises a control board 4200 comprising a printed circuit board (PCB) and a microcontroller 4270, which has connector 4240 to connect to the computer on a robot, and to which two camera modules 4100-L/R are attached. The camera modules 4100-L/R as shown are mounted at 90 degrees to each other. As each camera module typically has a field-of-view of ~120 degrees, the combined field of view can exceed 180 degrees (as was illustrated in FIG. 14A).

Each camera module 4100-L/R comprises a camera 4110-L/R that houses an imaging lens and semiconductor 2-D array sensing device. Ideally, the sensors will be dual-well light sensors. Each camera module 4100-L/R also comprises control electronics 4180-L/R and one or more high brightness LEDs 4130-L/R, preferably operating in the near infrared wavelength range (typically defined as having a wavelength between 700 nm and 2.5 microns, and may include, for example, LEDs operating with a wavelength of 850 nm). In some embodiments, the number and brightness of the LEDs should be large enough and high enough, respectively, to illuminate objects up to 5 meters away from the robot.

The layout and positioning of the camera 4110-L/R and control electronics 4180-L/R should be sufficiently distant from the LEDs 4130-L/R so that a clear line of sight is available from the LEDs to all angles that are to be collected and imaged by the lens. This, and the maximum height of the control electronics and emission height of the LEDs, dictate the minimum distance between the control electronics and the LEDs. Similarly the emission height of the LEDs and the height of the lens along with the angles that are sensed by the LED indicate the minimum distance between the LEDs and the lens.

A control signal is generated by the sensing chip in the camera 4110-L/R and passes through the control electronics 4180-L/R to generate a signal in the MHz regime. This signal modulates the LEDs 4130-L/R, switching them on and off at high speed. Light passes from the LEDs 4130-L/R into the surrounding environment, and, after scattering or reflecting from items in the environment, returns back to the camera 4110-L/R to be collected by the lens and imaged onto the sensor. The phase offset between the signal generated and the light coming back determines the distance that the objects are away that are being detected by the sensor. As such the sensor is able to determine the distance for objects are that are in the field of view of the camera lens.

The camera 4100-L/R can in a preferred embodiment communicate with a microcontroller 4270 on the control board 4200 through a cable 4140-L/R. This cable can be any number of cables known to those skilled in the art, and may even be a direct coupling, but in a preferred embodiment and as shown, a ribbon cable may be used. These cables 4140-L/R provides both power and signals to the cameras 4100-L/R and also allows the camera 4100-L/R to transmit data to the control board 4200. The microcontroller 4270 that controls the cameras 4100-L/R may also communicate information (such as the distance information produced by the cameras 4100-L/R and/or analyzed by microcontroller 4270) and receive power from a main computer on a robot (not shown) through a connector 4240.

IV. Additional Accessories and Extensions

Figure 17:
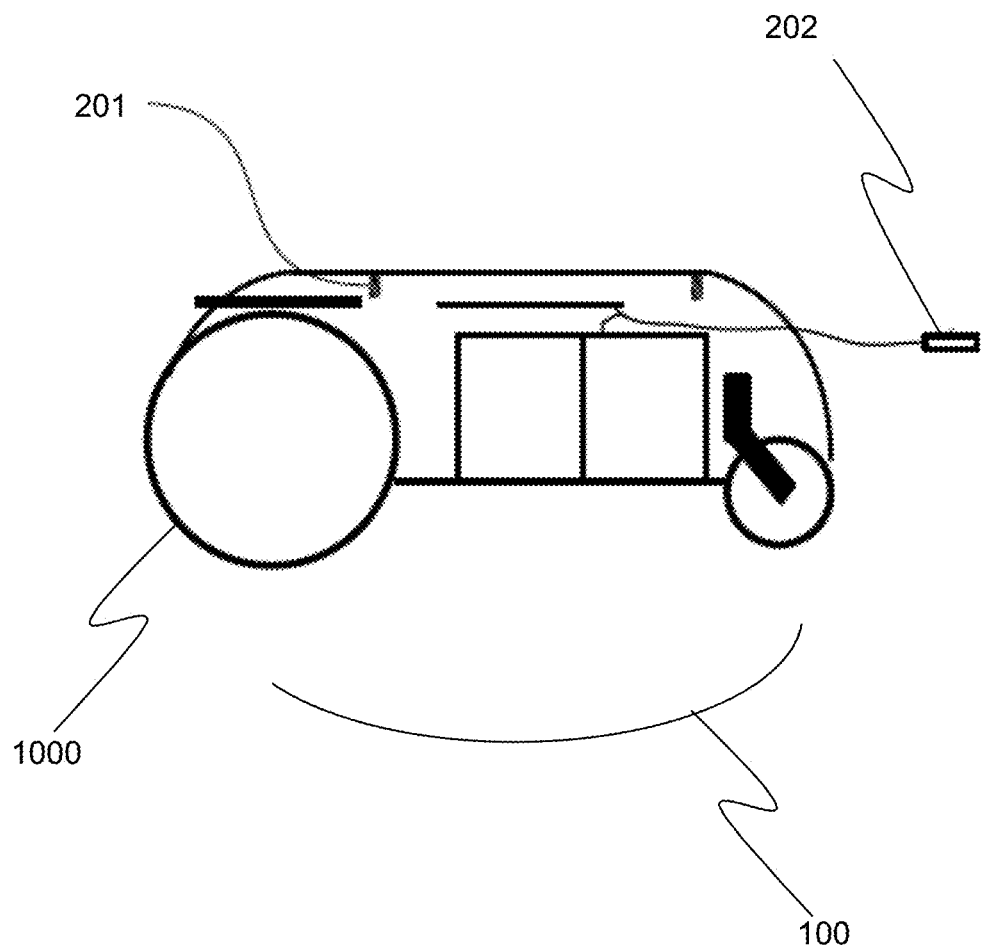
FIG. 17 illustrates an embodiment of the invention comprising an electrical coupling.

In the above-described first embodiment, the system cover 1300 may comprise a pattern of holes 1325 that allow additional items to be attached to the base unit 100, allowing the base unit to serve as a platform for structures and machines that extend the functionality of the robot. This coupling can be of a variety of types, as will be known to those skilled in the art. As illustrated in FIG. 17, the coupling could comprise a means for a physical coupling 201, such as boltholes or threaded screw holes that have been tapped into the cover, to allow additional structures and accessories to be attached to the base unit 100. The coupling could also comprise an electrical coupling 202 such as a pigtail cable with a connector to transfer power and data to the accessory. The coupling could also comprise an optical coupling to transfer data and/or power. The coupling could also be entirely virtual, in that it comprises of a standardized set of interface protocols for communication from one electronic device to another over a general-purpose data connection. This data coupling may comprise a data connection that is transmitted optically, or over infrared, radio or using any part of the electromagnetic spectrum, either through free space or a waveguide such as an electric wire or a fiber optic cable.

Figure 18:
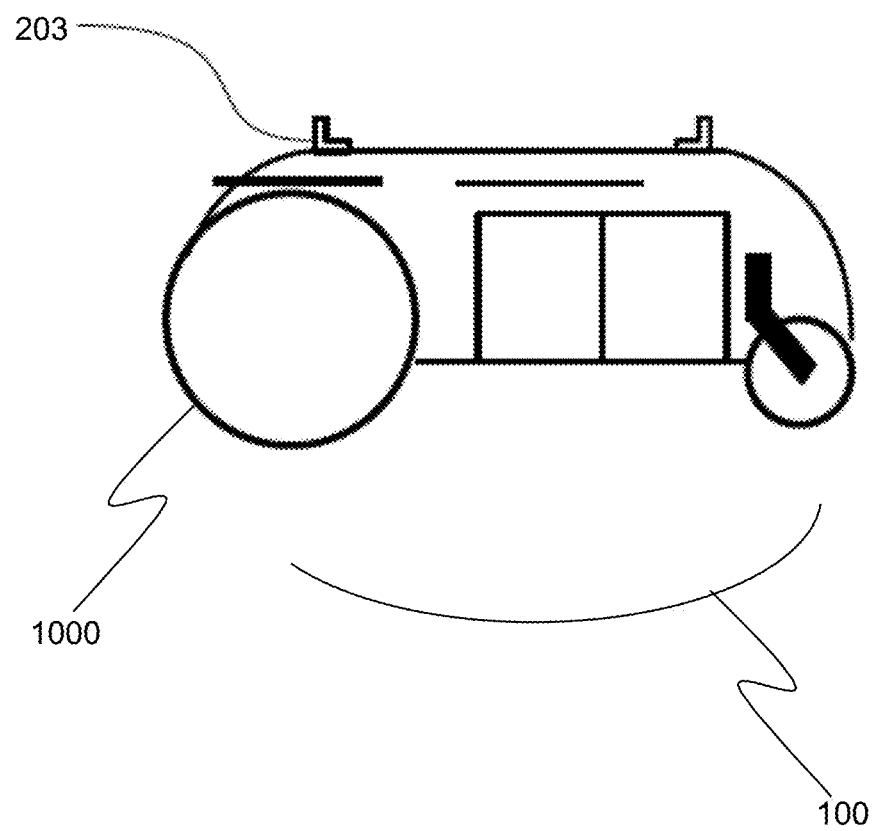
FIG. 18 illustrates an embodiment of the invention in which an attachment can be secured to the platform with quick release clasps.

FIG. 18 illustrates an embodiment in which the coupling comprises quick release clasps 203 that can be used to attach an additional structure or accessory.

Figure 19:
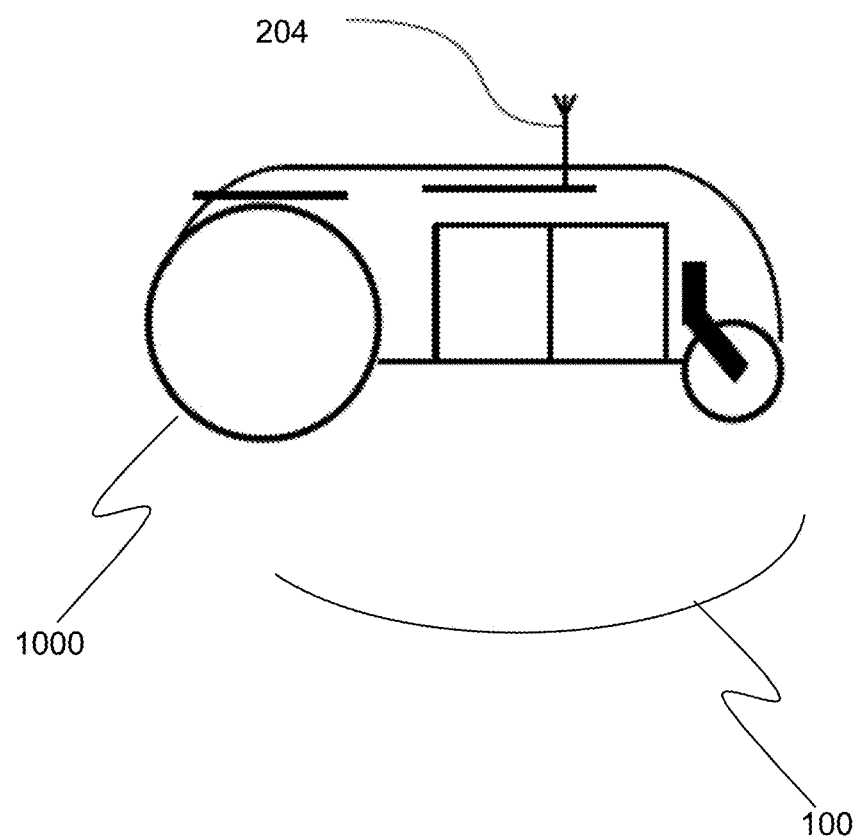
FIG. 19 illustrates an embodiment of the invention in which an attachment can comprises an antenna for wireless communication.

FIG. 19 comprises an alternative embodiment in which the coupling comprises a signal transmission device such as a radio antenna 204 or a laser transmission device or an acoustic signal transmission device that provides any type of information connectivity with the accessory. As someone skilled in the art will recognize, a large number of anticipated signals or physical couplings could be used to connect the device to external accessories to provide service.

The accessories themselves may comprise a large variety of structures, devices and machines.

Figure 20:
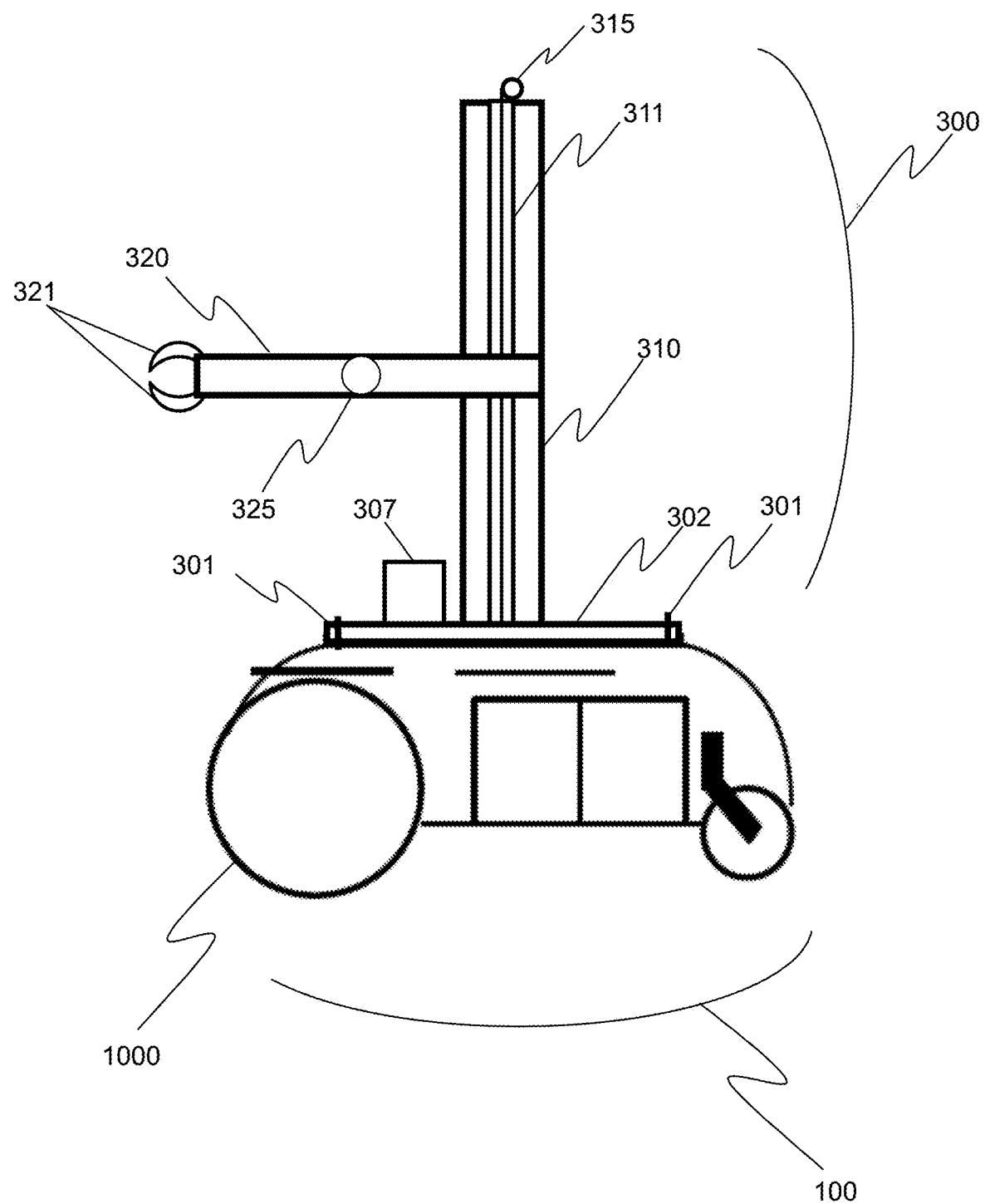
FIG. 20 illustrates an embodiment of the invention in which an attachment comprising a manipulator arm has been attached to the platform.

In one embodiment, as illustrated in FIG. 20, the accessory 300 comprises one or more manipulator arms 320. In the embodiment as illustrated, the accessory 300 comprises an attachment plate 302 that is bolted to the base unit 100 using bolts 301. Connected to the plate 302 is a vertical support 310 that allows the manipulator arm 320 to move up and down, pulled by a motor 315 along a track or tracks 311. Position encoders may be used to determine the elevation along the track, or the elevation may be determined by a servo motor configuration.

In this embodiment, the manipulator arm 320 may comprise joints 325 that allow it to bend, and may comprise a single arm or may comprise configurations with multiple arms that allow a large object to be held by the force exerted by two opposing arms, or released when that force is removed. Any given arm 320 may additionally comprise manipulators 321 that may also be independently controlled to pinch or grab objects, and also release them.

The vertical motion, horizontal motion, and bending motion of individual arms, joints, and manipulators may be controlled electronically using control elements such as servo motors governed by a computer 307 attached to the accessory 350. This accessory 300 and the computer 307 may have its own source of power, such as a battery, built into the accessory, or may in turn may be powered by a connector that links it to the battery 1500 within the base unit 100 or to the circuit board 1600 within the base unit 100.

In other embodiments, the on-board computer 1700 in the base unit 100 may provide the additional computations and instructions needed by the various servo motors for control the manipulator arms, and a data connection between the circuit board 1600 and the accessory 300 may also be needed.

Figure 21:
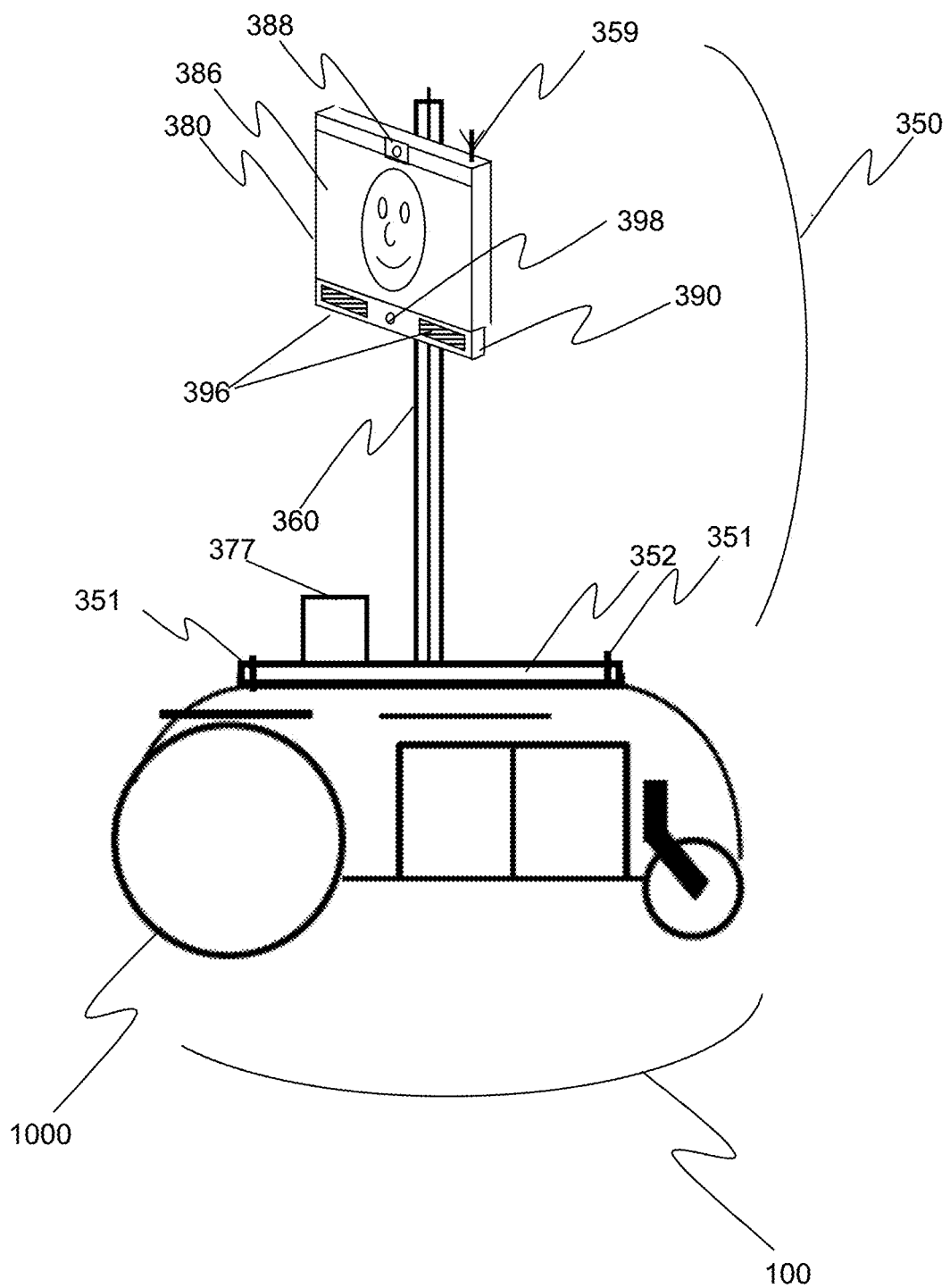
FIG. 21 illustrates an embodiment of the invention in which an attachment comprising an audio and video display has been attached to the platform.

In one embodiment, as illustrated in FIG. 21, the accessory 350 comprises an audio/video system for use as a telepresence device. In the embodiment as illustrated, the accessory 350 comprises an attachment plate 352 that is bolted to the base unit 100 using bolts 351. Connected to the plate 302 is a vertical support 360 that supports a video system 380 comprising a display 386 and a video camera 388, along with an attached audio system 390, comprising speakers 396 and a microphone 398. Connectivity for the system is provided by one or more antennas 359.

The display 386 and speakers 396 allow a person at a remote location to show their face and facial expressions and have their voice heard as if they were in the position of the robotic accessory, while the video camera 388 and microphone 398 allow the person in the remote location to see what is happening in front of the accessory 350, as if they were standing in the location of the accessory 250.

The motion of the telepresence accessory 350 and base unit 100 may be governed by a computer 377 attached to the accessory 350. This accessory 350 and the computer 377 may have its own source of power, such as a battery, built into the accessory 350, or may in turn may be powered by a connector that links it to the battery 1500 within the base unit 100 or to the circuit board 1600 within the base unit 100.

In other embodiments, the on-board computer 1700 in the base unit 100 may provide the additional computations and instructions needed by telepresence accessory, and a data connection between the circuit board 1600 and the accessory 350 may also be needed.

V. System Extensions

Figure 22:
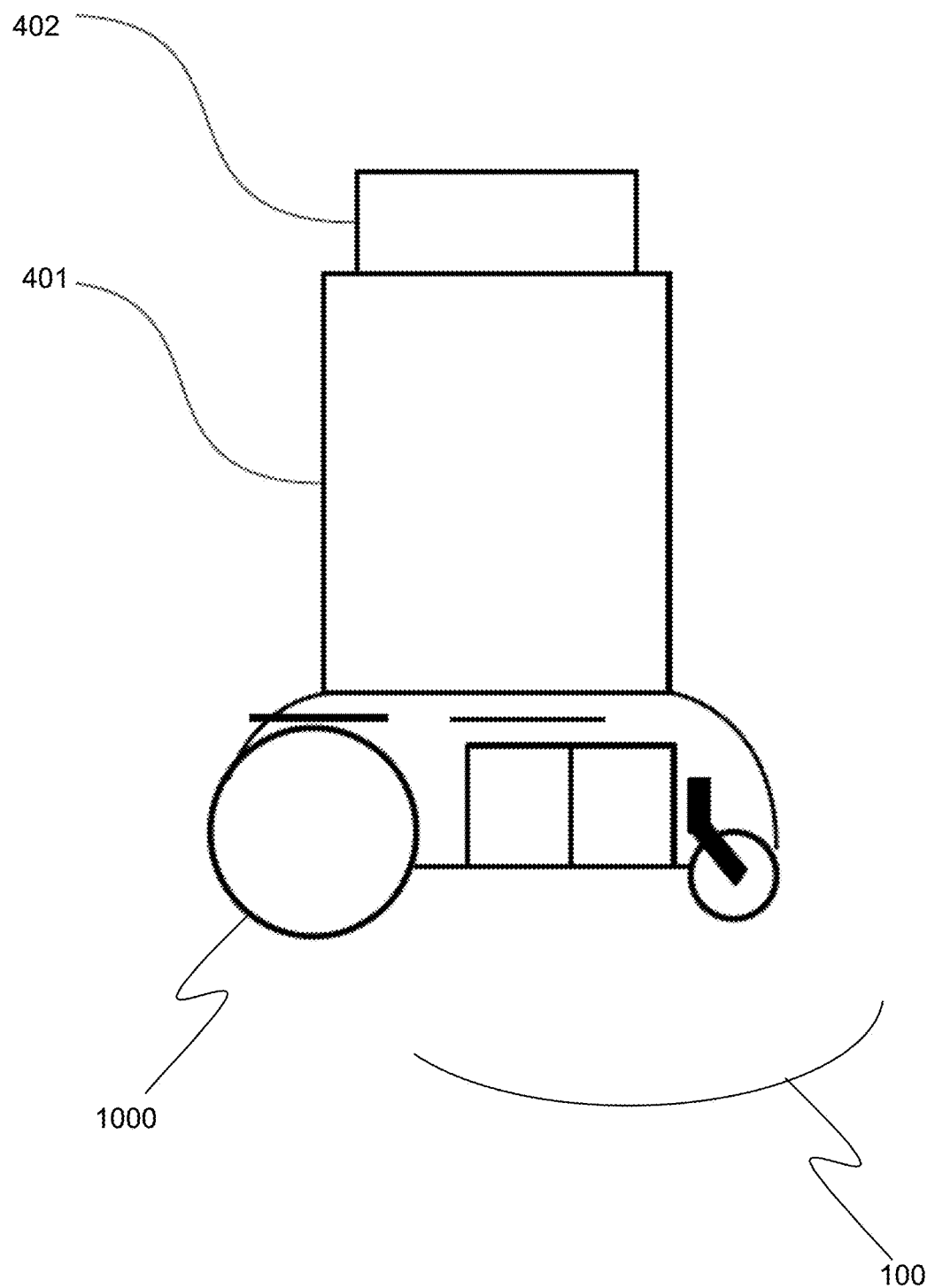
FIG. 22 illustrates an embodiment of the invention in which an attachment comprising a mechanism for carrying and delivering items has been attached to the platform.

FIG. 22 illustrates a configuration in which a structure 301 is attached for delivering other items 402. These items may be food or drink items, they may be service items, parts, accessories, items used by humans, items used by animals, items used by machines, items used by other robots, etc. These may be items that have a packaging or items with no packaging. They may be solid, liquids, gasses or any combination of these.

Figure 23:
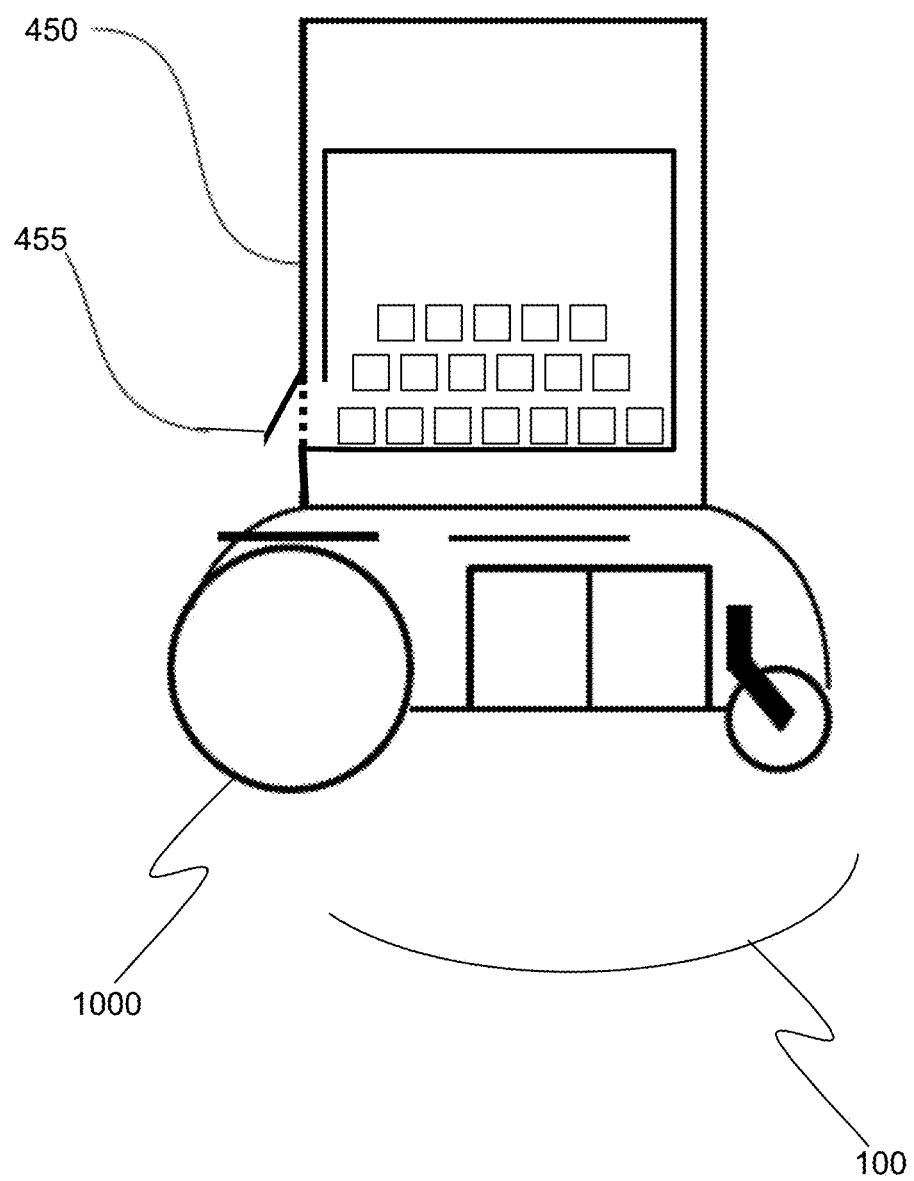
FIG. 23 illustrates an embodiment of the invention in which an attachment comprising an internal chamber to contain packages and a hatch for delivery has been attached to the platform.

FIG. 23 illustrates an embodiment in which objects may be contained in the structure 450 and may be delivered through an opening in the bottom of the structure that may comprise a hatch 455.

Figure 24:
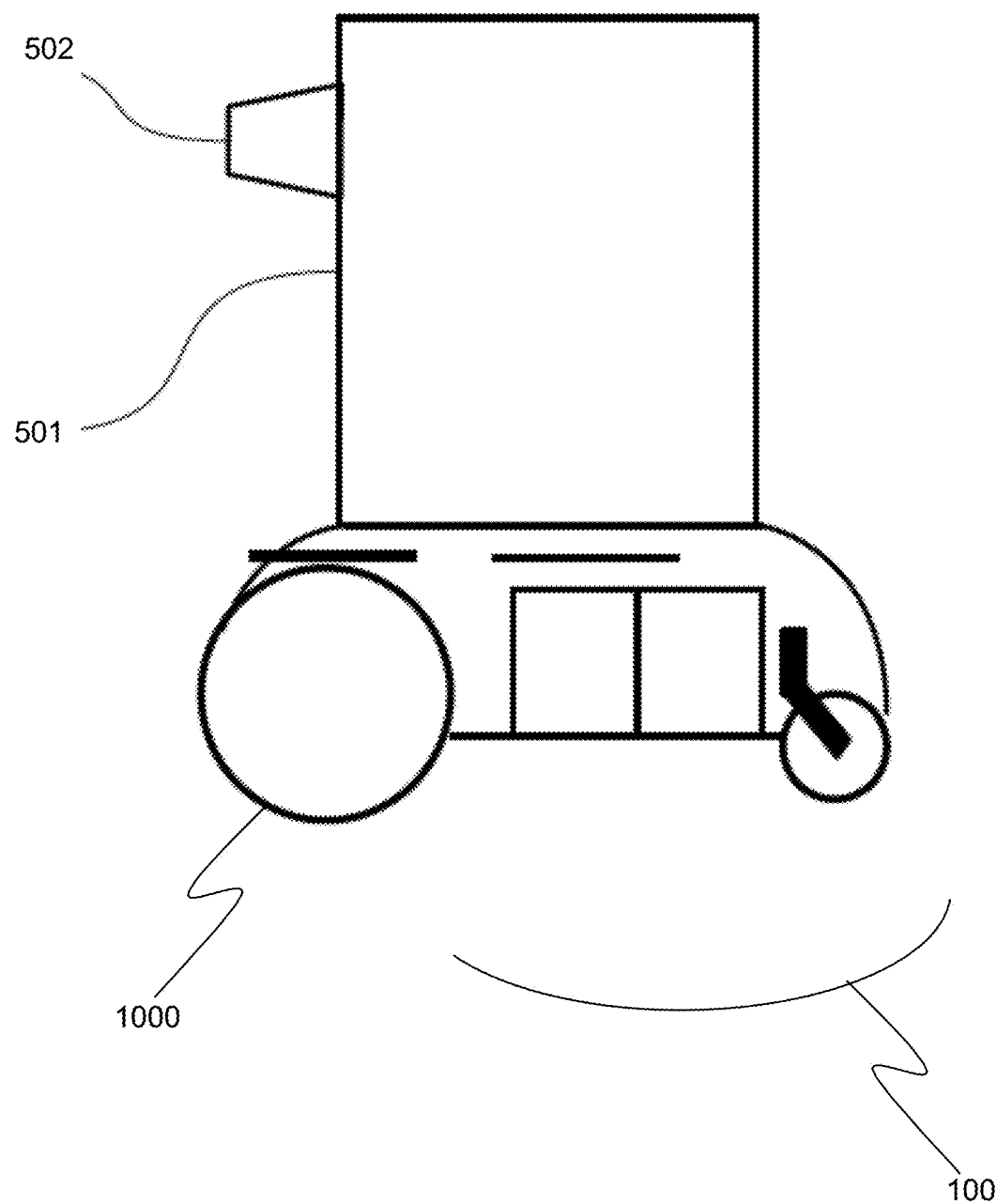
FIG. 24 illustrates an embodiment of the invention in which an attachment comprising a mechanism for delivering cups has been attached to the platform.

FIG. 24 illustrates an embodiment in which an accessory 501 is used to dispense cups 502.

Figure 25:
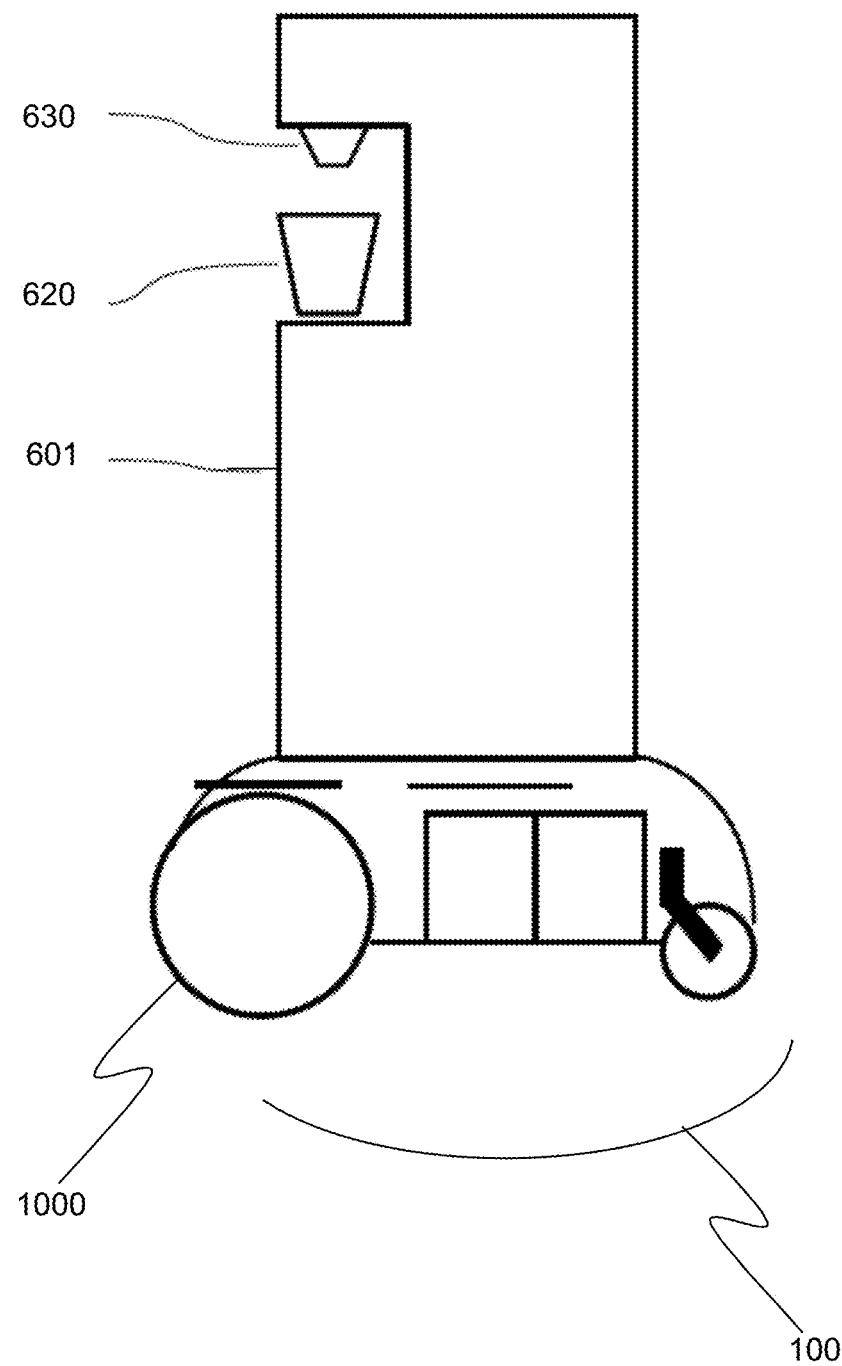
FIG. 25 illustrates an embodiment of the invention in which an attachment comprising a mechanism for delivering soft drinks has been attached to the platform.

FIG. 25 illustrates an embodiment in which an accessory 601 is used to deliver liquids, such as soft drinks, that would flow from a nozzle 630 in to a container 620. In some embodiments, this accessory is configured as a soda fountain.

Figure 26:
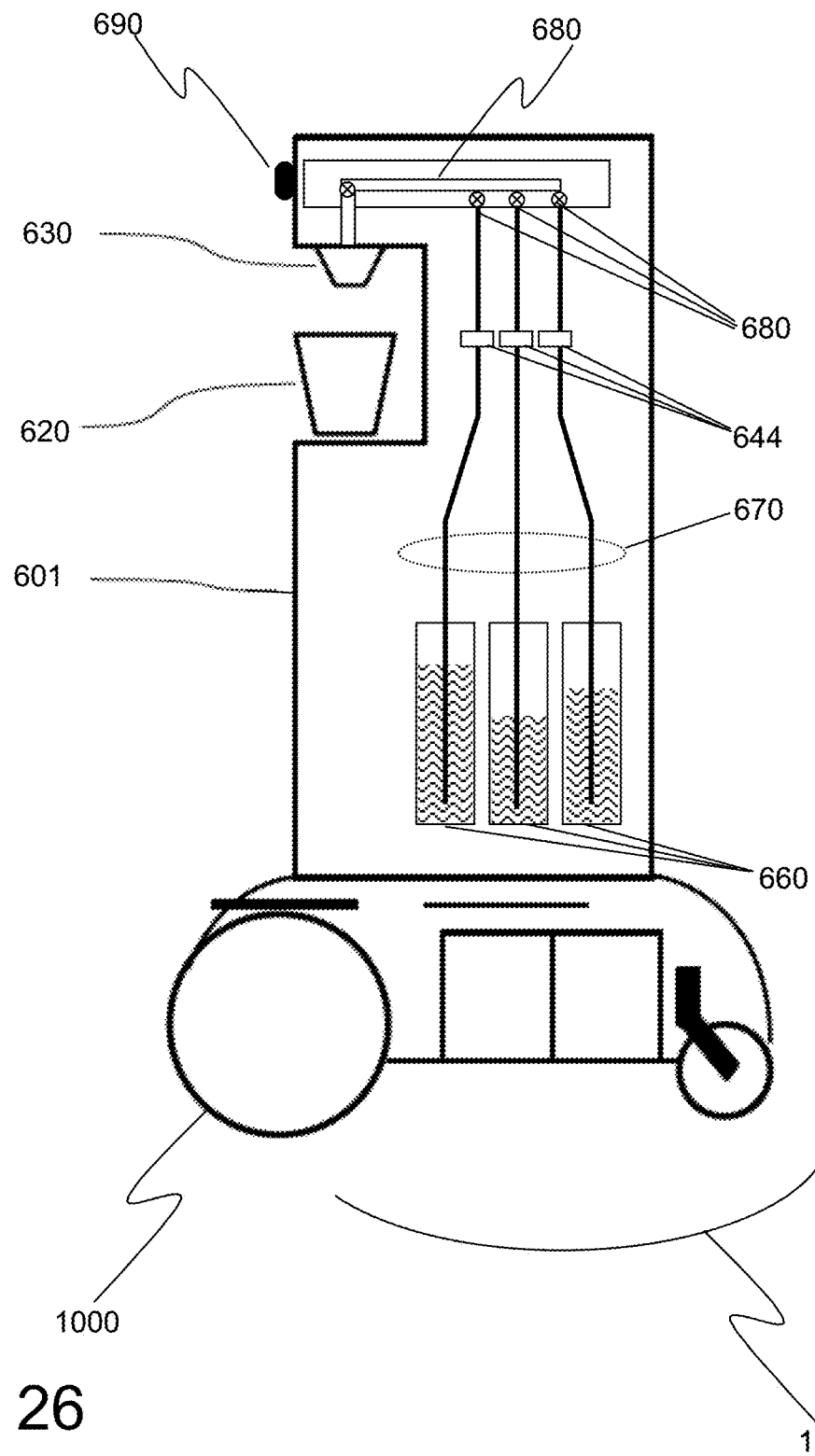
FIG. 26 illustrates an embodiment of the invention in which an attachment comprising a mechanism for delivering mixed drinks has been attached to the platform.

FIG. 26 illustrates a further improvement of the embodiment of FIG. 25, in which the accessory 601 is used to deliver mixed drinks. The ingredients for the drinks may be stored in storage containers 660 such as tanks inside the accessory. The ingredients may include concentrated syrup for soft drinks, soda water, juices of various types, alcoholic beverages, or any other substance that a bartender may access to prepare beverages. The accessory 601 may also comprise conduits 670 such as hoses or tubes and may also comprise pumps 644 that allow the various substances in the containers 660 to be drawn up into a mixing channel 680. Various valves 680 may be used in combination with the pumps 644 to control the relative quantities of ingredients to be drawn from the storage containers 660. The proportions of the ingredients may be dictated by a panel 690 that contains electronics that allow the user to, for example, press a button selecting a particular soft drink, such as Coca-Cola®, or another beverage, such as Guinness® Stout, and the selection is converted electronically into a set of instructions that control the pumps 644 and valves 680 to dispense the appropriate measure of a beverage that, as in the previous embodiment, would flow from a nozzle 630 in to a container 620.

Figure 27:
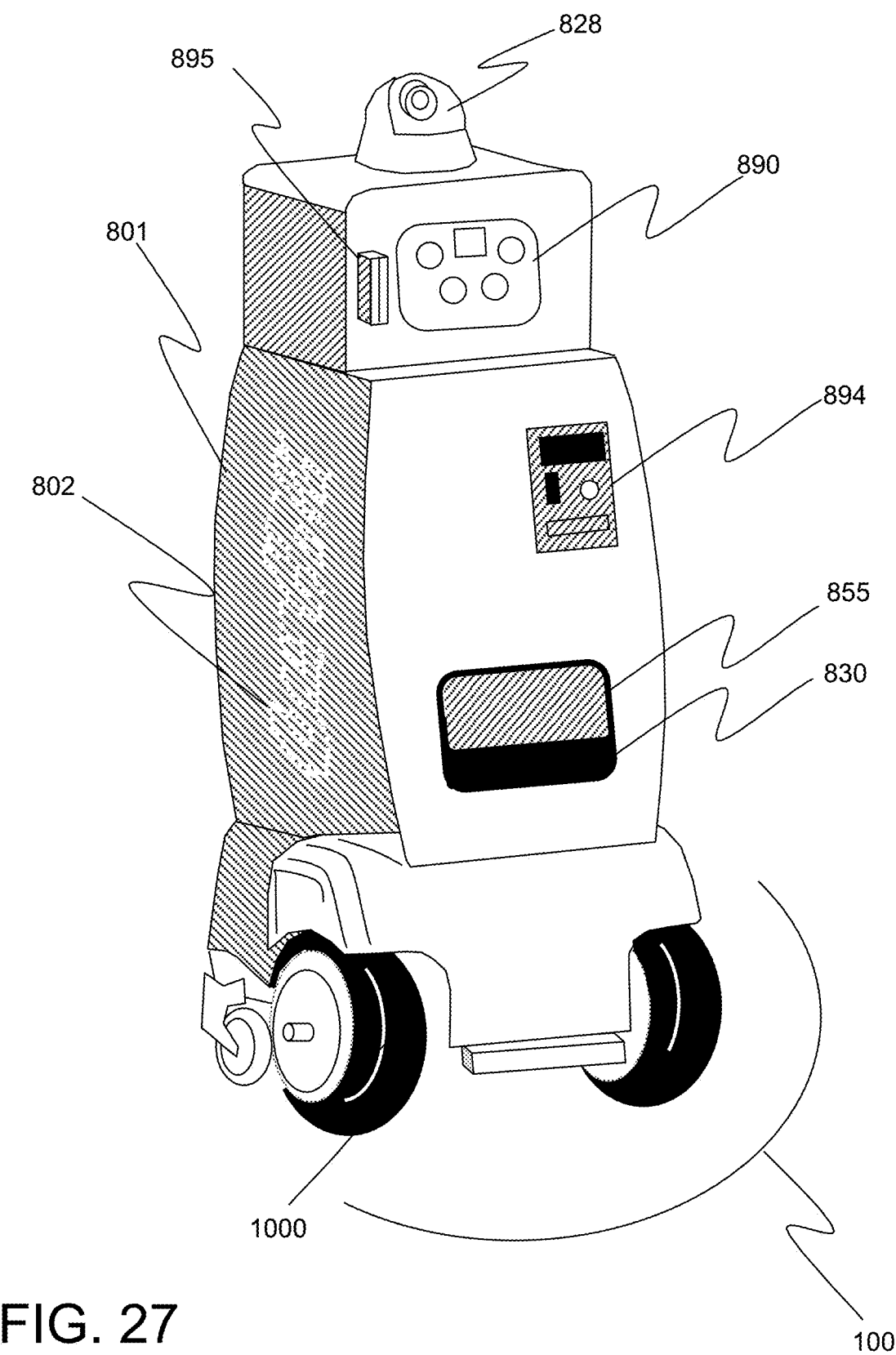
FIG. 27 x22 illustrates an embodiment of the invention in which a structure that displays marketing messages while vending a product has been attached to the platform.

FIG. 27 illustrates an example of an embodiment employed as a vending machine that additionally comprises a means to communicate one or more marketing messages. The embodiment comprises a structure 801 that may take on the iconic imagery or shape associated with a particular brand. This structure may have visible on it markings 802 that represent the trade dress, trademark, or brand of a particular company. Additional marketing messages may be transmitted via a display 890 attached to the device. Such a display 890 may comprise a touchscreen that enables interactivity between a potential user and the system. This interactivity may be used to allow the user to purchase product from the system.

The system may accept payment by means of a conventional cash acceptance system 894 that will be known by those skilled in the art, or by means of a card payment swipe system 895 that will be known by those skilled in the art. Product can be dispensed through an opening on the system 830 that may comprise a hatch 855. The system may make use of a camera 828 which, in combination with an on-board or wirelessly connected computing capability, may identify people to navigate towards or may otherwise direct the activity of the system.

In addition to the means to transmit visually the marketing messages shown here, those skilled in the art will realize that marketing messages may also be transmitted through an audio system, video projection from the system, a video display mounted on the system, by means of fragrances released by the system, and can attempt to excite any sensory effect for which there is an association with a particular company, trademark or brand.

VI. Implemention by Computer

Figure 28:
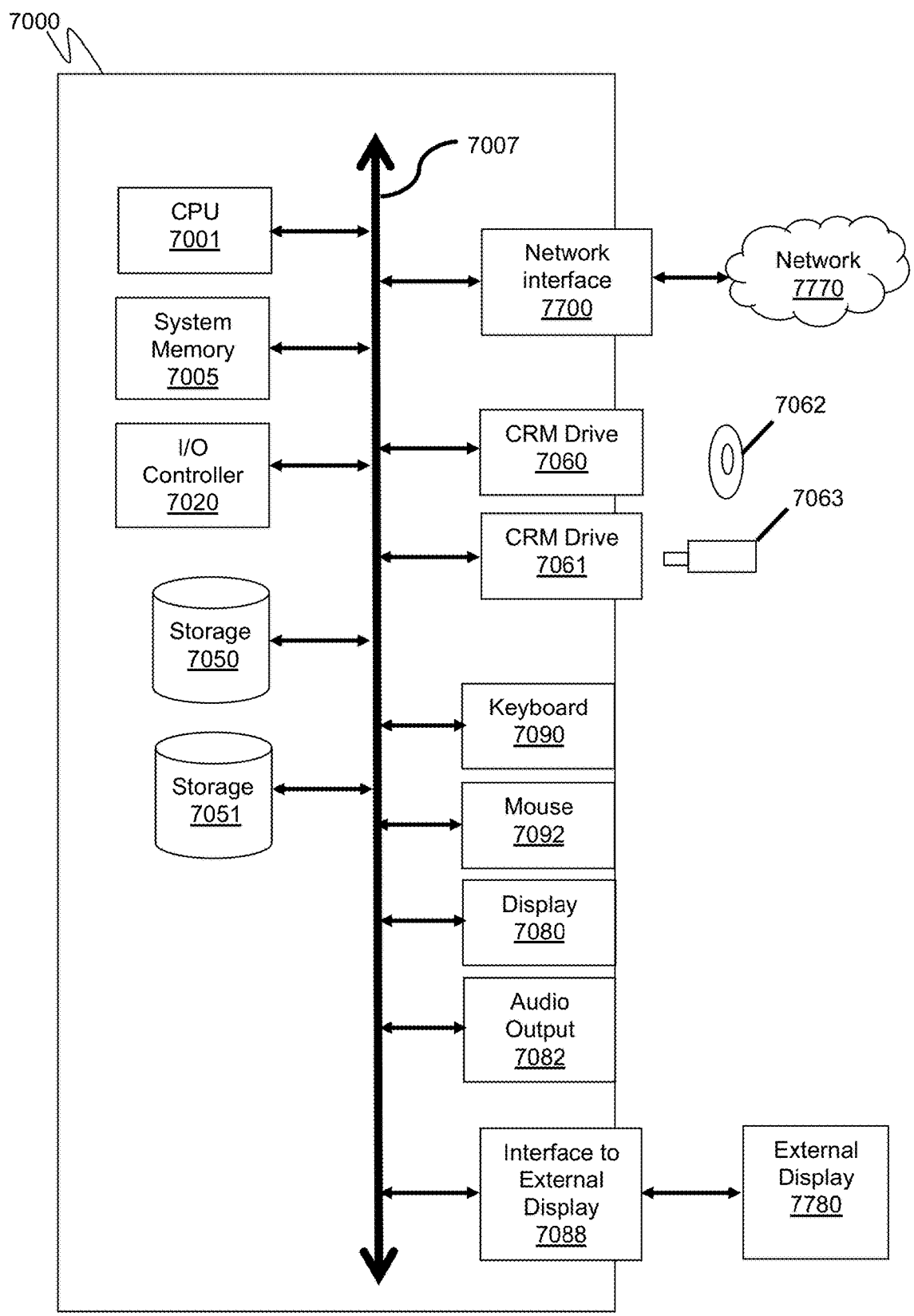
FIG. 28 illustrates a block diagram of a computer system as may be used in embodiments of the invention.

FIG. 28 illustrates a block diagram of an exemplary computer system that can serve as a platform for portions of embodiments of the present invention. Computer code in programming languages such as, but not limited to, C, C++, C#, Java®, Javascript®, Objective C®, Boo, Lua, assembly, Fortran, APL, etc., and executed in operating environments such as Windows® and all its variants, Mac OS-X®, iOS®, Android®, Blackberry®, UNIX®, Linux®, etc., can be written and compiled into a set of computer or machine readable instructions that, when executed by a suitable computer or other microprocessor based machine, can cause the system to execute the method of the invention.

Such a computer system 7000, can comprise a bus 7007 which interconnects major subsystems of computer system 7000, such as a central processing unit (CPU) 7001, a system memory 7010 (typically random-access memory (RAM), but which may also include read-only memory (ROM), flash RAM, or the like), an input/output (I/O) controller 7020, one or more data storage systems 7030, 7031 such as an internal hard disk drive or an internal flash drive or the like, a network interface 7700 to an external network 7777, such as the Internet, a fiber channel network, or the like, an equipment interface 7600 to connect the computer system 7000 to a network 607 of other electronic equipment components, and one or more drives 7060, 7061 operative to receive computer-readable media (CRM) such as an optical disk 7062, compact disc read-only memory (CD-ROM), compact discs (CDs), floppy disks, universal serial bus (USB) thumb-drives 7063, magnetic tapes and the like. The computer system 7000 may also comprise a keyboard 7090, a mouse 7092, and one or more various other I/O devices such as a trackball, an input tablet, a touchscreen device, an audio microphone and the like. The computer system 7000 may also comprise a display device 7080, such as a cathode-ray tube (CRT) screen, a flat panel display or other display device; and an audio output device 7082, such as a speaker system. The computer system 7000 may also comprise an interface 7088 to an external display 7780, which may have additional means for audio, video, or other graphical display capabilities for remote viewing or analysis of results at an additional location.

Bus 7007 allows data communication between central processor 7000 and system memory 7010, which may comprise read-only memory (ROM) or flash memory, as well as random access memory (RAM), as previously noted. The RAM is generally the main memory into which the operating system and application programs are loaded. The ROM or flash memory can contain, among other code, the basic input/output system (BIOS) that controls basic hardware operation such as the interaction with peripheral components. Applications resident with computer system 7000 are generally stored on storage units 7030, 7031 comprising computer readable media (CRM) such as a hard disk drive (e.g., fixed disk) or flash drives.

Data can be imported into the computer system 7000 or exported from the computer system 7000 via drives that accommodate the insertion of portable computer readable media, such as an optical disk 7062, a USB thumbdrive 7063, and the like. Additionally, applications and data can be in the form of electronic signals modulated in accordance with the application and data communication technology when accessed from a network 7777 via network interface 7700. The network interface 7700 may provide a direct connection to a remote server via a direct network link to the Internet via an Internet PoP (Point of Presence). The network interface 7700 may also provide such a connection using wireless techniques, including a digital cellular telephone connection, a Cellular Digital Packet Data (CDPD) connection, a digital satellite data connection or the like.

Many other devices or subsystems (not shown) may be connected in a similar manner (e.g., document scanners, digital cameras and so on). Conversely, all of the devices shown in FIG. 28 need not be present to practice the present disclosure. In some embodiments, the devices and subsystems can be interconnected in different ways from that illustrated in FIG. 28. The operation of a computer system 7000 such as that shown in FIG. 28 is readily known in the art and is not discussed in further detail in this Application.

Code to implement the present disclosure can be stored on computer-readable storage media such as one or more of: the system memory 7010, internal storage units 7030 and 7031, an optical disk 7062, a USB thumbdrive 7063, one or more floppy disks, or on other storage media. The operating system provided for computer system 7000 may be any one of a number of operating systems, such as MS-DOS®, MS-WINDOWS®, UNIX®, Linux®, OS-X® or another known operating system.

Moreover, regarding the signals described herein, those skilled in the art will recognize that a signal can be directly transmitted from one block to another, between single blocks or multiple blocks, or can be modified (e.g., amplified, attenuated, delayed, latched, buffered, inverted, filtered, or otherwise modified) by one or more of the blocks. Furthermore, the computer as described above may be constructed as any one of, or combination of, computer architectures, such as a tower, a blade, a low power single board computer, an embedded computer, a development board, a desktop, a laptop, a workstation, or a mainframe (server) computer. The computer system may also be any one of a number of other portable computers or microprocessor based devices such as a mobile phone, a smart phone, a tablet computer, an iPad®, an e-reader, or wearable computers such as smart watches, intelligent eyewear and the like.

The computer system may also be one of several microprocessor-based game consoles, such as the Xbox®, Xbox 360®, and Xbox One® manufactured by Microsoft Corp. of Redmond, Wash.; the GameCube™, Wii™, Wii U™, GameBoy™ DS™, 3DS™, DSi™, etc. from Nintendo Co. Ltd. of Kyoto, Japan; the Playstation®, Playstation® 2, Playstaion® 3, and Playstation® 4, PSP™, etc. manufactured by Sony Corp. of Tokyo, Japan; and the OUYA console running the Android™ operating system and manufactured by OUYA Inc. of Santa Monica, Calif.

The computer system may also be one or more of the embedded computers found in appliances, toys, robots, medical devices and systems, automobiles, aircraft, flight simulators, and other configurations that will be known to those skilled in the art.

VII. Hardware and Software

Accordingly, embodiments of the invention or portions thereof may be encoded in suitable hardware and/or in software (including firmware, resident software, microcode, etc.). Furthermore, embodiments of the present invention or portions thereof may take the form of a computer program product on a non-transitory computer readable storage medium having computer readable program code comprising instructions encoded in the medium for use by or in connection with an instruction execution system. Non-transitory computer readable media on which instructions are stored to execute the methods of the invention may therefore in turn be embodiments of the invention as well. In the context of this Application, a computer readable medium may be any medium that can contain, store, communicate, propagate, or transport the program for use by or in connection with the instruction execution system, apparatus, or device.

The computer readable medium may be, for example but not limited to, an electronic, magnetic, optical, electromagnetic, infrared, or semiconductor system, apparatus, or device. More specific examples (a non-exhaustive list) of a computer readable media would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

VIII. Limitations

With this application, several embodiments of the invention, including the best mode contemplated by the inventors, have been disclosed. It will be recognized that, while specific embodiments may be presented, elements discussed in detail only for some embodiments may also be applied to others.

While specific materials, designs, configurations and fabrication steps have been set forth to describe this invention and the preferred embodiments, such descriptions are not intended to be limiting. Modifications and changes may be apparent to those skilled in the art, and it is intended that this invention be limited only by the scope of the appended claims.

What is claimed is:

1. A robotic system comprising:
   a power source;
   a means to move through a designated environment;
   an attached computing device;
   a navigation system to direct the motion of the apparatus through the designated environment; and
   a means for coupling a first additional accessory comprising a connector for providing power from the power source to the first additional accessory; and
   at least two sensor modules positioned to detect distances to objects within the designated environment; wherein each of the at least two sensor modules comprises:
   a time-of-flight optical system comprising:
      one or more light sources that provide modulated illumination;
      an imaging lens configured to collect light originating from the light sources that has been scattered and/or reflected from objects in the environment;
      an array imaging sensor positioned at a location where the lens forms an image; and
      electronic circuitry that performs phase sensitive analysis of a signal from the imaging sensor and determines an estimate of the distance from the object to the sensor.

2. The robotic system of claim 1, wherein
   the power source comprises a battery selected from the group consisting of:
   a lead acid battery, a deep cycle lead acid battery, a sealed lead acid battery,
   an AGM lead acid battery, a gel lead acid battery, a nickel-cadmium battery,
   a nickel-metal-hydride battery, a lithium battery, a silicon-mediated lithium battery,
   a lithium ion battery, and an alkaline battery.

3. The robotic system of claim 1, wherein
   the power source comprises a common power conversion system selected from the group consisting of consisting of:
   a fuel cell, a hydrogen fuel cell, a hydrocarbon powered heat engine, a microwave transmission energy power source, an inductive energy source, a flywheel, a flywheel energy storage system, and a Carnot engine.

4. The robotic system of claim 1, wherein
   the computing device comprises at least one microprocessor.

5. The robotic system of claim 1, wherein
   the computing device directs the activity of the means to move through said designated environment.

6. The robotic system of claim 1, wherein
   the navigation system utilizes the attached computing device.

7. The robotic system of claim 1, further comprising
   a means to communicate using a wireless communication network.

8. The robotic system of claim 1, additionally comprising:
   a connector for communicating data between the robotic system and the first additional accessory.

9. The robotic system of claim 1, wherein
   the at least two sensor modules are oriented at approximately 90 degrees relative to each other.

10. The robotic system of claim 1, wherein
    at least a portion of the modulated illumination has wavelength in the near infrared wavelength range.

11. The robotic system of claim 1, wherein
    the one or more light sources comprise one or more light emitting diodes (LEDs) configured as the source of the modulated illumination.

12. The robotic system of claim 1, additionally comprising
    control electronics comprising a microcontroller, wherein
    the microcontroller is connected to each of the at least two sensor modules, and the microcontroller is additionally connected to the computing device.

13. The system of claim 1, wherein
    distance information from the two sensor modules is provided to the navigation system of the robot.

14. A method for environmental sensing in a robotic system, comprising:
    determining one set of distances to objects within 5 meters of a robot using a first time-of-flight optical sensor;
    determining a second set of distances to additional objects within 5 meters of the robot using a second time-of-flight optical sensor;
    processing the two sets of distances to form a representation of the environment of the robot.

15. The method of claim 14, wherein
    the step of processing comprises a wall detect mode.

16. The method of claim 14, wherein
    the representation of the environment is provided as data to a navigation system for the robot.

17. A non-transient computer readable medium containing program instructions for causing a computer to perform a method for environmental sensing in a robotic system, comprising:
    determining one set of distances to objects within 5 meters of a robot using a first time-of-flight optical sensor;
    determining a second set of distances to additional objects within 5 meters of the robot using a second time-of-flight optical sensor;
    processing the two sets of distances to form a representation of the environment of the robot.

18. The computer readable medium of claim 17, wherein
    the step of processing comprises a wall detect mode.

19. The method of claim 17, wherein
    the representation of the environment is provided as data to a navigation system for the robot.

* * * * *